United States Patent [19]
Mino et al.

[11] Patent Number: 5,747,158
[45] Date of Patent: May 5, 1998

[54] CHEMICALLY ADSORBED MULTILAYER FILM

[75] Inventors: Norihisa Mino, Osaka; Kazufumi Ogawa, Nara, both of Japan

[73] Assignee: Matsushita Electric Industrial Co., Ltd., Osaka, Japan

[21] Appl. No.: 858,190

[22] Filed: Apr. 18, 1997

Related U.S. Application Data

[63] Continuation of Ser. No. 364,016, Dec. 27, 1994, abandoned, which is a continuation of Ser. No. 98,793, Jul. 29, 1993, abandoned.

Foreign Application Priority Data

Jul. 29, 1992 [JP] Japan .................... 4-202647

[51] Int. Cl.$^6$ .................... B32B 7/04; B32B 17/06
[52] U.S. Cl. .................... 428/333; 428/391; 428/429; 428/447; 428/448; 428/450; 428/451; 428/452; 428/695
[58] Field of Search .................... 428/429, 333, 428/446, 447, 448, 451, 695, 391, 450, 452

[56] References Cited

U.S. PATENT DOCUMENTS

| | | | |
|---|---|---|---|
| 4,539,061 | 9/1985 | Sagiv | 156/278 |
| 4,673,474 | 6/1987 | Ogawa | 204/157.64 |
| 5,008,127 | 4/1991 | Ogawa | 427/36 |
| 5,011,963 | 4/1991 | Ogawa et al. | 556/485 |
| 5,030,521 | 7/1991 | Nishikawa et al. | 428/694 |
| 5,209,976 | 5/1993 | Ogawa | 428/391 |
| 5,225,274 | 7/1993 | Ogawa et al. | 428/333 |
| 5,240,774 | 8/1993 | Ogawa et al. | 428/411.1 |
| 5,443,901 | 8/1995 | Mino et al. | 428/336 |

FOREIGN PATENT DOCUMENTS

| | | |
|---|---|---|
| 0 363 924 | 4/1990 | European Pat. Off. |
| 0 472 990 | 3/1992 | European Pat. Off. |
| 0 474 228 | 3/1992 | European Pat. Off. |
| 0 491 251 | 6/1992 | European Pat. Off. |
| 0 492 545 | 7/1992 | European Pat. Off. |
| 0 511 548 | 11/1992 | European Pat. Off. |

*Primary Examiner*—D. S. Nakarani
*Attorney, Agent, or Firm*—Morrison & Foerster LLP

[57] ABSTRACT

A lubricating film of the invention is comprised of a chemically adsorbed monomolecular film, in which long-chain molecules are chemically bonded to at least one surface of a substrate via siloxane bonding, and layers of chemically adsorbed monomolecular film are formed on the surface of the previously formed chemically adsorbed monomolecular film after changing the groups at the end of chemical admolecules to monofunctional groups. The lubricating film has excellent endurance against sliding, with lubrication and anti-abrasion properties, and such properties of the film can be maintained for a long period. A chemically adsorbed monomolecular film can be formed on a substrate surface via covalent bonding (SiO—) by the dehydrochlorination reaction between active hydrogens on the substrate surface and the silane-based chemical adsorbent comprising dimethylsilyl groups. The substrate formed with the chemically adsorbed monomolecular film is then treated by an oxidation treatment, an alkaline treatment or an energy irradiation, thus changing the dimethylsilyl groups to the active hydrogen groups such as hydroxyl groups, imino groups or the like. The above-noted chemical adsorbent is contacted to the substrate surface, thus forming a chemically adsorbed multilayer film. Moreover, a long-chain hydrocarbon compound can be physically adsorbed to the surface of the chemically adsorbed multilayer film.

7 Claims, 5 Drawing Sheets

CHEMICALLY ADSORBED MULTILAYER FILM

This application is a continuation of application Ser. No. 08/364,016, filed Dec. 27, 1994, which was a continuation of application Ser. No. 08/098,793, filed Jul. 29, 1993, both now abandoned.

FIELD OF THE INVENTION

The invention relates to the formation of a lubricated substrate surface requiring a lubricating property. More specifically, the invention relates to a lubricating film and method of manufacturing the same.

BACKGROUND OF THE INVENTION

Members with a lubricating property have been widely used recently. Slide members used in mechanical elements (shafts, bearings, cranks or the like) and recording members (magnetic tapes, magnetic discs, photo-electro magnetic discs, etc.) are examples of such members. A magnetic recording medium is mentioned in the following descriptions as an example of a conventional lubrication technology. Taking the place of coated magnetic recording mediums such as magnetic tape—in which a polyester film or the like is coated with solvent and a magnetic material such as ferrite powder—magnetic recording mediums with ferromagnetic metallic thin films formed on non-magnetic supports by a planting method, sputtering method, vacuum deposition method, ion planting method or the like have been researched as high density magnetic mediums.

For efficient operation, the magnetic recording medium located under the magnetic head is required to run smoothly and stably at the stage of recording or playing magnetic signals even if the relative motion of the medium to the head is fast at such a stage. Unfortunately, the high density magnetic mediums which are produced in the above-noted methods have poor anti-abrasion and running properties. Particularly, ferromagnetic metallic thin film of the mediums produced in the above-noted methods cannot sustain rough conditions of the magnetic recording and playing processes. As a result, the mediums are likely to run with instability due to friction against the heads or the like, and the output of the mediums declines drastically because of abrasion and damage to the mediums or the generation of abrasion powder after running the mediums for many hours. Therefore, it has been required to apply a lubricating agent on the surfaces of magnetic recording mediums. In addition, in order to improve the recording density, it has been required to make the surfaces of the mediums as flat as possible. The surface roughness of the magnetic layer of a video tape currently has its center line average height around 0.02 micrometers; however, to further improve recording density of the magnetic recording mediums, the center line average height should be lowered by one digit. Contact area against the heads widens as the surface roughness of the mediums decreases, thus increasing the coefficient of friction. In this sense, an improved lubricating agent has been in demand.

Lubricating agents have been used for improving a running property and lowering the coefficient of friction of tapes, and the agents have been selected in consideration of the compatibility between the agents and binders, and of the mobility of a coating film. As a conventional lubricating agent, a long-chain hydrocarbon compound has been mainly used, and other kinds of lubricating agents are sometimes added to the agent (*Denki Zairyo No Trypology* by Realize Co., Ltd., p.185).

The conventional technology of lubricating ceramics, metals, resins, woods, inorganics, papers, fibers or the like is the same as the technology mentioned above.

The use of solid lubricating agents has been declining since it is difficult to coat the agents with uniform thicknesses. Liquid lubricating agents, on the other hand, have been used for forming lubricating films by spin-coating or dipping methods. However, the thickness of the film formed by using the conventional liquid lubricating agents is at least five nanometers, and there is a limit on moving the medium close to the head. Therefore, the density and capacity of the medium is not likely to be improved. Although the lubricating film is needed especially for the convex surfaces of the magnetic recording medium to reduce the abrasion created by the friction between the head and the medium, the agent is likely to stay in the concave surfaces rather than on the convex surfaces. It is also difficult to control the supply of the liquid lubricating agent, and the agent is likely to scatter when a large quantity of it is supplied; as a result, reading and writing to the magnetic records becomes difficult.

SUMMARY OF THE INVENTION

In order to solve the above-noted problems of conventional technologies, an objective of the invention is to manufacture a lubricating film with excellent endurance against sliding, with anti-abrasion, running and lubrication properties and a method of manufacturing the same in which a lubricating film is formed by building up a uniformly thin, chemically adsorbed monomolecular film with a thickness at the nanometer level.

In order to accomplish the above objective, a lubricating film (chemically adsorbed multilayer film) of the invention is formed in the following procedures:

covalently bonding a chemically adsorbed monomolecular film comprising carbon-chain organic molecules to a substrate surface; and building up at least one chemically adsorbed monomolecular film comprising carbon-chain organic molecules on the above-mentioned chemically adsorbed monomolecular film via a monofunctional Z-bond (wherein Z represents at least one element selected from the group consisting of Si, Ti and Sn).

It is preferable in the invention that organic compounds comprising carbon chains are physically adsorbed to the outermost layer of a chemically adsorbed multilayer film.

It is preferable in the invention that the chemical bond of the chemically adsorbed monomolecular film is at least one bond selected from the group consisting of Formulas 1, 2 and 3.

Formula 1 comprises the designation

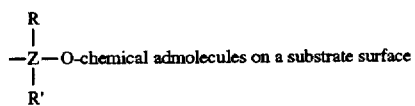

where R and R' represent a lower alkyl group, and Z represents at least one element selected from the group consisting of Si, Ti and Sn;

Formula 2 comprises the designation

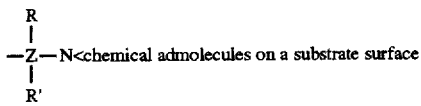

where R and R' represent a lower alkyl group, and Z represents at least one element selected from the group consisting of Si, Ti and Sn;
Formula 3 comprises the designation

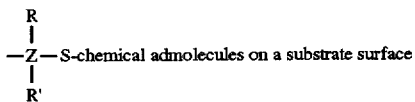

where R and R' represent a lower alkyl group, and Z represents at least one element selected from the group consisting of Si, Ti and Sn.

It is preferable in the invention that the long-chain organic molecules constituting at least the surface of the chemically adsorbed multilayer film comprise fluorocarbon groups.

It is preferable in the invention that the number of carbons of a carbon-chain organic molecule is between 8 and 30.

It is preferable in the invention that the substrate is at least one material chosen from the group consisting of ceramics, metals, resins, wood materials, inorganics, papers, fibers and information recording mediums.

It is preferable in the invention that the carbon-chain organic molecule comprises side chains.

It is preferable in the invention that the carbon-chain organic molecule is a mixture of at least two kinds of molecules.

A method of manufacturing a lubricating film (chemically adsorbed multilayer film) of the invention comprises the following procedures:

contacting a compound comprising carbon-chain organic molecules to at least one substrate surface, thus generating a low molecule elimination reaction and forming a chemically adsorbed monomolecular film;

introducing active hydrogen groups to the surface of the above-noted chemically adsorbed monomolecular film; and contacting a monofunctional Z—X compound comprised of monofunctional groups at the end of molecules (where Z represents at least one element selected from the group consisting of Si, Ti and Sn, and X represents a halogen atom) to the surface of the chemically adsorbed monomolecular film, thereby generating a low molecule elimination reaction between the compound and the active hydrogen groups and building up at least a second chemically adsorbed monomolecular film on the above-noted first chemically adsorbed monomolecular film.

It is preferable in the invention that the method of introducing active hydrogen groups is at least one method selected from the group consisting of energy irradiation, oxidation treatment, and alkaline treatment.

It is preferable in the invention that a chemically adsorbed monomolecular film is formed by removing unreacted chemical adsorbent on the surface after the procedure of the low molecule elimination reaction.

It is preferable in the invention that an organic compound comprising carbon chains is coated and physically adsorbed to the outermost layer of a chemically adsorbed multilayer film.

It is preferable in the invention that a chemically adsorbed monomolecular film or a chemically adsorbed multilayer film is formed either by a method of dipping and holding a substrate in a solution containing a compound or a method of contacting the substrate to the vaporized solution.

It is preferable in the invention that a chemically adsorbed monomolecular film or a chemically adsorbed multilayer film is formed in an atmosphere of 35% or less relative humidity.

It is preferable in the invention that the active hydrogens introduced onto the surface of the monomolecular film derive from hydroxyl groups, amino groups, imino groups, carboxyl groups, thiol groups, alpha positions of carbonyl groups, alpha positions of cyano groups, alpha positions of nitro groups, alpha positions of double bonds, benzylic positions, sulfonic acid groups, sulfinic acid groups and phosphoric acid groups.

It is preferable in the invention that energy irradiation is achieved through use of X-rays, electron beams, and gamma rays, or combinations thereof.

Based on the above-noted compositions of the invention, an ultra thin lubricating film with a uniform thickness at the nanometer level, and with excellent resistance to sliding, having anti-abrasion, running, and lubrication properties can be formed on a substrate surface, since at least one surface of the substrate is built up with a chemically adsorbed monomolecular film comprising carbon-chain organic compounds.

Moreover, according to the invention, an organic compound comprising carbon chains is physically adsorbed to the outermost layer of the chemically adsorbed multilayer film (lubricating film). Therefore, for instance, if at least one surface of a magnetic recording medium is built up with chemically adsorbed monomolecular films via oxygen, sulfur and nitrogen atoms and is also formed with a physically adsorbed film of organic molecules on the outermost layer of the chemically adsorbed monomolecular films, the chemically adsorbed multilayer film on the medium cannot be abraded by the friction against the magnetic head and other members while the medium is operating. An ultra thin lubricating film with a thickness at the nanometer level with excellent resistance to sliding, and having anti-abrasion, running, and lubrication properties can be formed on the surfaces of the members without degrading the original functions of the members.

Based on the invention, at least one substrate surface is formed with a chemically adsorbed monomolecular film—in which long chain molecules are chemically bonded to the surface—and is built up with chemically adsorbed monomolecular films on the above-mentioned chemically adsorbed monomolecular film. As a result, the chemically adsorbed multilayer film (lubricating film) formed on a magnetic recording medium such as magnetic head or magnetic tape is flexible, and cannot be abraded by the friction against members while the medium is running. The excellent endurance, running and anti-abrasion properties of the medium can be maintained for a long period due to the chemically adsorbed multilayer film (lubricating film) on the medium. In addition, this lubricating film can be applied not only to recording mediums but to many other types of sliding members.

DETAILED DESCRIPTION OF THE INVENTION

Figure 1:
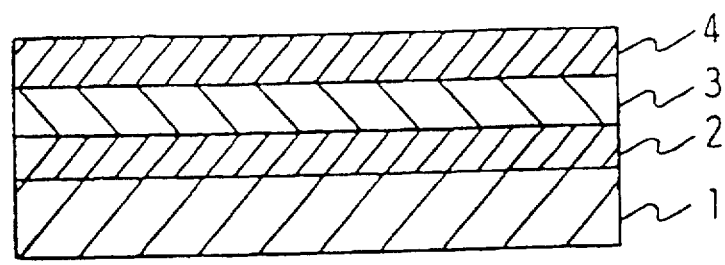
FIG. 1 is a cross sectional view of a lubricating film of Examples 1, 2, 3, 4, 5 and 23 according to the invention.

A chemically adsorbed monomolecular film is formed by a de-halogenation reaction between the active hydrogens of hydroxyl groups, amino groups, imino groups, carboxyl groups, thiol groups, alpha positions of carbonyl groups, alpha positions of cyano groups, alpha positions of nitro groups, alpha positions of double bonds, benzylic positions, sulfonic acid groups, sufinic acid groups and phosphoric acid groups, and the halogens of halogenated silane groups, halogenated titanium groups, halogenated stanyl groups or the like of the chemical admolecules. Alternatively, the film may be formed by a coordinate bonding between metals on a substrate surface and the silanol groups of chemical admolecules. The thickness of the chemically adsorbed monomolecular film is uniform, and can be controlled by changing the number of hydrocarbon groups constituting the film. When the number of hydrocarbon groups is 20, the thickness of the film is about 2.5 nanometers according to an ellimpsometric method and X-ray photoelectric system (XPS). The orientation of the molecules of the film can be inferred from measuring the contact angles. For example, in case of a chemically adsorbed monomolecular film comprising trifluorocarbon groups at the end of molecules, the surface energy of the film was significantly low and 15 millinewton/meter, thus indicating the deposition of the trifluorocarbon groups to the surface of the film and showing good orientation of the molecules of the film.

As a process of forming a chemically adsorbed multilayer film, a chemically adsorbed monomolecular film comprising functional groups, e.g., —SiXnYm group (wherein X represents a halogen group; Y represents a lower alkyl group having one to six carbon atoms; n and m represent a positive integer from 1 to 3, and n+m=3) is formed. The functional group of the film is changed to a hydroxyl group either by an alkaline or oxidation treatment. If the chemically adsorbed monomolecular film comprises an unsaturated bond group, the unsaturated bond group should be changed to an imino and/or amino group by energy irradiation such as an electron beam. Moreover, in case that the chemically adsorbed monomolecular film comprises an ester bond group, the ester bond group ought to be changed to a hydroxyl group by an oxidation treatment. A chemically adsorbed multilayer film can be finally formed by building up a chemically adsorbed monomolecular film on the surface of the previously formed chemically adsorbed monomolecular film.

Ceramics, metals, resins, woods and fibers with their active hydrogens or metals exposed to their surfaces can be used as a substrate of the invention. The invention is not restricted by the shape of the substrates since the substrates are treated by a gaseous phase reaction or a dipping and holding reaction. Moreover, the chemically adsorbed monomolecular film formed on the substrate surface is transparent, thereby not reducing the gloss, tone and like qualities of the substrate.

It is preferable that the organic compound applied to the surface of the chemically adsorbed monomolecular film is at least one compound selected from the group consisting of long-chain hydrocarbon-based fatty acid, fatty acid ester, silicon derivative, fatty acid salt, fatty acid amide and fluorocarbon derivative.

As shown in Examples 2, 10, 11, 12, 13, 14, 15, 16, 17 and 21, the number of hydroxyl groups can be increased by treating the substrate surface beforehand with molecules comprising at least three SiCl groups such as tetrachlorosilane, trichlorosilane, $SiCl_3(OSiCl_2)_nOSiCl_3$ (wherein n represents 0 or a positive integer), thus increasing the number of exposed active hydrogens on the substrate surface.

In this invention, moreover, a low molecule elimination reaction means dehydrochlorination reaction, dehydration reaction or the like. The invention is specifically described by referring to the following embodiments.

EXAMPLE 1

A substrate 1 was provided by the following procedures:

filling a high molecular binder with powder of iron oxide;

applying the binder on a polyethylene terephthalate film (base film);

drying and compressing the binder applied on the base film to make it highly dense, thus providing substrate 1.

Substrate 1 was then shaped like a disc, and a thin film of silicon oxide was formed on the substrate surface, exposing numerous active hydrogens for adsorption.

A solution used for forming a chemically adsorbed monomolecular film was prepared by dissolving $H(CH_3)_2Si(CH_2)_{18}SiCl_3$—chemical admolecules having dimethylsilyl groups at one end and trichlorosilyl groups at another end of long chain alkyl groups—into Freon-113 at a concentration of 1 millimol/liter in a dry atmosphere. The preparation of the solution was carried out in a glove box, containing nitrogen gas, with 5% or less relative humidity.

Substrate 1 was dipped and held in the prepared solution for one hour at 23° C. in a dry atmosphere. After concomitant loss of HCl, the admolecules became adsorbed onto the substrate to form monomolecular film 2, shown in Formula 4.

Formula 4

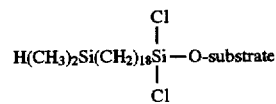

The substrate surface was then washed with flowing extra-pure water for 15 minutes, thus changing the SiCl groups in Formula 4 to SiOH groups by hydrolysis. The substrate was then dried, thereby forming —Si—O—Si— bonds by a dehydration reaction between the SiOH group and neighbouring SiOH group.

An oxidation treatment solution was prepared by the following procedures:

dissolving 140 mg potassium fluoride (reaction accelerator) into 50 ml methanol and throughly agitating the solution at room temperature;

dissolving 250 mg potassium hydrogen carbonate into 50 ml tetrahydrofuran, adding 25 ml hydrogen peroxide solution (30% by volume) and then throughly agitating the solution at room temperature;

mixing the above-noted two solutions, thus fixing the oxidation treatment solution.

Substrate 1 formed with chemically adsorbed monomolecular film 2 was dipped and held in the prepared oxidation treatment solution for 10 hours at room temperature. As a result, the C—Si bond of the dimethylsilyl group at the end of the long-chain hydrocarbon molecule of chemically adsorbed monomolecular film 2 was cut off, and a hydrocarbon group instead was formed at the end of the long-chain hydrocarbon chain molecule of the film.

Substrate 1 was again dipped and held in a nonaqueous solution containing $H(CH_3)_2Si(CH_2)_{18}(CH_3)_2SiCl$, thus forming a chemically adsorbed monomolecular film 3—the second layer of a chemically adsorbed multilayer film. The conditions for preparing the above-noted nonaqueous solution and forming the film were the same as the previously described conditions applied for forming chemically adsorbed monomolecular film 2. As a result, a chemically adsorbed multilayer film shown in Formula 5 was formed.

Formula 5

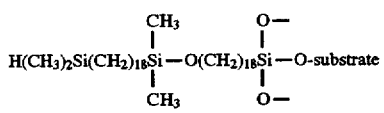

The methylene group at the end of the long-chain hydrocarbon molecule was changed to a hydroxyl group by the same oxidation treatment mentioned above. Furthermore, substrate 1 was dipped and held in a solution containing $CF_3(CH_2)_{18}(CH_3)_2SiCl$, thus forming a chemically adsorbed monomolecular film 4—the third layer of the chemically adsorbed multilayer film.

FIG. 1 shows a cross sectional view of the chemically adsorbed multilayer film (lubricating film).

Figure 2:
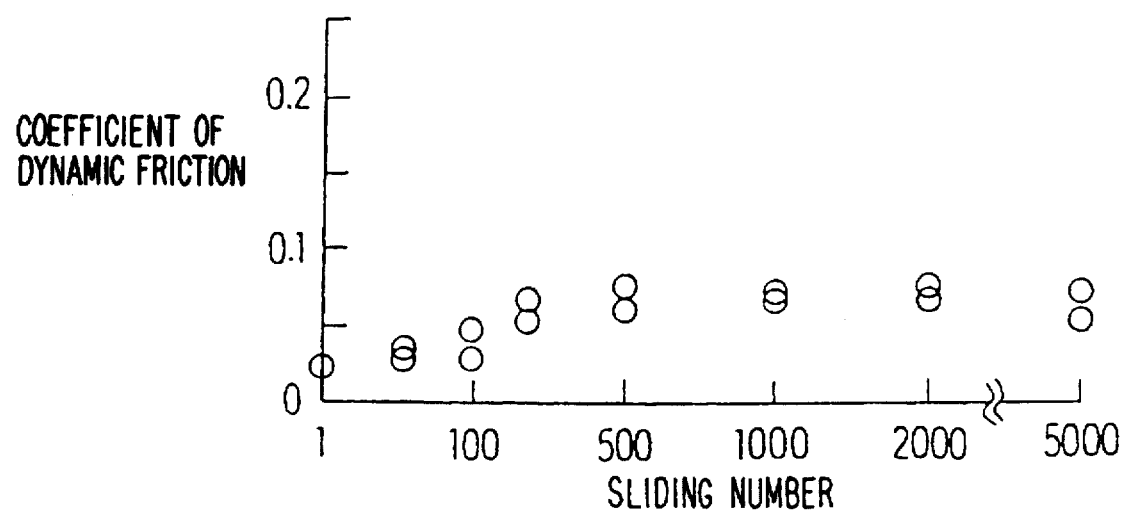
FIG. 2 shows the results of a sliding test of one embodiment according to the invention.

A sliding test was directed to the surface of substrate 1 formed with the above-noted lubricating film. A steel ball, weighted 100 grams, was slid on the substrate surface in a range of 10 cm. FIG. 2 shows the results of the sliding test on a graph where sliding number (X-axis) is plotted as a function of the coefficient of dynamic friction (Y-axis). According to the figure, even though the sliding number is increased, the coefficient of dynamic friction remains the same, thus showing the effect of a durable lubricating film on the substrate surface. After forming a chemically adsorbed multilayer film (lubricating film) of the invention on the surface of a magnetic recording disc, a CSS test—the test of repeatedly starting and stopping the disc—was performed on the disc placed under a magnetic head. According to the test result, 200,000 repetitions of starting and stopping were cleared by the disc.

EXAMPLE 2

The substrate of Example 1, with no formation of chemically adsorbed monomolecular film, was used in this example.

A solution was prepared by dissolving $H(CH_3)_2Si(CH_2)_{18}SiCl_3$—chemical admolecules having dimethylsilyl groups at one end and trichlorosilyl groups at another end of long chain alkyl groups—into the mixed solvent of 80% by weight of hexadecane, 12% by weight of carbon tetrachloride and 8% by weight of chloroform at a concentration of 1 millimol/liter in a dry atmosphere. The preparation of the solution was directed in a glove box, containing nitrogen gas, with 5% or less relative humidity.

The substrate was dipped and held in the prepared solution for one hour at 23° C. in a dry atmosphere. After concomitant loss of HCl, the admolecules became adsorbed onto the substrate, thus forming a monomolecular film. The adsorbed film and substrate are shown in Formula 6.

Formula 6

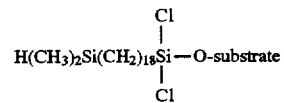

The substrate was then washed with flowing extra-pure water for 15 minutes, thus changing the SiCl groups in Formula 6 to —SiOH groups by hydrolysis. The substrate was then dried, thereby forming —Si—O—Si— bonds by a dehydration reaction between the SiOH group and neighbouring SiOH group.

As an alkaline treatment solution, 100 ml of 1% by weight of tetramethyl ammonium hydroxide aqueous solution was prepared. The substrate was dipped and held in the prepared solution for 10 minutes at room temperature. As a result, the —SiH bond of the dimethylsilyl group at the end of long-chain hydrocarbon molecule was cut off, and a hydroxyl group instead was formed at the end of the molecule.

The substrate was again dipped and held in a solution containing $H(CH_3)_2Si(CH_2)_{18}(CH_3)_2SiCl$, thereby forming the second layer of a chemically adsorbed multilayer film. The conditions of preparing the above-noted solution and forming the film were the same as the previously described conditions applied for forming the first chemically adsorbed monomolecular film. As a result, a chemically adsorbed multilayer film shown in Formula 7 was formed.

Formula 7

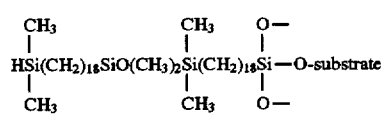

The methylene group at the end of the long-chain hydrocarbon molecule was changed to a hydroxyl group by the alkaline treatment described above. The substrate was then dipped and held in a solution containing $CF_3(CH_2)_{18}(CH_3)_2SiCl$, thus forming the third layer of the chemically adsorbed multilayer film.

The cross sectional view of the chemically adsorbed multilayer film (lubricating film) of the example is the same as FIG. 1.

A sliding test was directed to the substrate formed with the above-noted lubricating film. A steel ball, weighted 100 grams, was slid on the substrate surface in a range of 10 cm. Even though the sliding number was increased, the coefficient of dynamic friction remained the same, thus showing the effect of a durable lubricating film on the substrate surface. After forming a chemically adsorbed multilayer film (lubricating film) of the invention on the surface of a magnetic recording disc, a CSS test was directed to the disc. According to the test result, 200,000 repetitions of starting and stopping were cleared by the disc.

EXAMPLE 3

The substrate of the example was prepared by the following procedures:

filling a high molecular binder with powder of iron oxide; shaping the above-noted binder like a disk;

forming a thin film of silicon oxide on the surface of the binder, thus providing the substrate with numerous active hydrogens exposed for adsorption.

As a next step, a solution was prepared by dissolving $CH_2=CH(CH_2)_{18}SiCl_3$—chemical admolecules comprising vinyl groups at one end and trichlorosilyl groups at another end of long-chain alkyl groups—into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box with 5% or less relative humidity.

The substrate was dipped and held in the prepared solution for one hour at 23° C. in a dry atmosphere. After concomitant loss of HCl, the admolecules became adsorbed onto the substrate, thus forming a monomolecular film. The adsorbed film and substrate are shown in Formula 8.

Formula 8

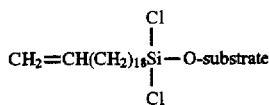

The substrate surface was then washed with flowing extra-pure water for 15 minutes. As a result, the SiCl groups in Formula 8 were changed to SiOH groups by hydrolysis. The substrate was then dried, thus forming —Si—O—Si— bonds by a dehydration reaction between the SiOH groups and neighbouring SiOH groups.

As a next step, the substrate was irradiated with an electron beam. The top side of the stainless steel (SUS) container was covered with aluminum foil, and was blanketed with nitrogen gas, thus preparing an apparatus used for an irradiation treatment. The substrate was irradiated with 300 keV acceleration voltage, 50 microamperes electronic current, 1 atm gas-pressure and with 0.02 Gy/sec irradiation speed (absorbed dose rate) at room temperature for 100 seconds. As a result, the unsaturated groups at the end of long-chain hydrocarbon molecules (vinyl groups in this example) were changed to imino and/or amino groups.

The second layer of a chemically adsorbed multilayer film was formed by dipping and holding the substrate having imino and/or amino groups at the end of the long-chain hydrocarbon molecules into a solution containing $CH_2=CH(CH_2)_{18}(CH_3)_2SiCl$. The conditions for preparing the solution and forming the film were the same as the previously described conditions applied for forming the first chemically adsorbed monomolecular film. A second chemically adsorbed multilayer film shown in Formula 9 was then formed.

Formula 9

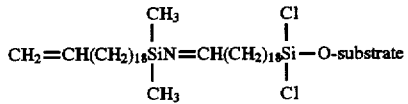

The above-noted irradiation treatment by an electron beam was again directed to the substrate, thus changing the groups at the end of molecules to imino and/or amino groups. The irradiated substrate was then dipped and held in a solution containing $CF_3(CH_2)_{18}(CH_3)_2SiCl$, thus forming the third layer of the chemically adsorbed multilayer film.

The cross sectional view of the chemically adsorbed multilayer film (lubricating film) of the example is the same as FIG. 1.

A sliding test was directed to the substrate formed with the above-noted lubricating film. A steel ball, weighted 100 grams, was slid on the substrate surface in a range of 10 cm. Even though the sliding number was increased, the coefficient of dynamic friction remained the same, thus showing the effect of a durable lubricating film on the substrate surface. After forming a chemically adsorbed multilayer film (lubricating film) of the invention on the surface of a magnetic recording disc, a CSS test was directed to the surface of the disc. According to the test result, 200,000 repetitions of starting and stopping were cleared by the disc.

EXAMPLE 4

A high molecular binder filled with powder of iron oxide was shaped like a disc, and formed with a thin film of silicon oxide, thus providing a substrate of the example, having hydroxyl groups containing numerous active hydrogens on the surface exposed for adsorption.

A solution was prepared by dissolving $H(CH_3)_2Si(CH_2)_{18}SiCl_3$—chemical admolecules having dimethylsilyl groups at one end and trichlorosilyl groups at another end of long-chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

The substrate was then dipped and held in the prepared solution for one hour at 23° C. in a dry atmosphere. As a result, a chemically adsorbed monomolecular film was formed by the dehydrochlorination reaction between the chemical admolecules and the hydroxyl groups on the substrate surface.

In order to remove the chemical admolecules that were not chemically reacted but physically adsorbed to the hydroxyl groups of the substrate surface, the substrate was agitated and washed in chloroform for 15 minutes in a dry atmosphere. This procedure was repeated once; as a result, a chemically adsorbed monomolecular film, in which the molecules were more regulated in one direction than the molecules of the chemically adsorbed monomolecular films in Examples 1, 2 and 3, was formed in this example. As in the following examples, the requirement in the above-noted procedures for washing the substrate in chloroform can be determined by the kinds and purposes of members.

The substrate was then washed with flowing extra-pure water for 15 minutes. As a result, the SiCl groups were reacted to neighbouring SiCl groups.

An oxidation treatment solution was prepared by the following procedures:

dissolving 140 mg potassium fluoride (reaction accelerator) into 50 ml methanol and throughly agitating the solution at room temperature;

dissolving 250 mg potassium hydrogen carbonate into 50 ml tetrahydrofuran, adding 25 ml hydrogen peroxide solution (30% by volume) and then throughly agitating the solution at room temperature;

mixing the above-noted two solutions, thus fixing the oxidation treatment solution.

The substrate formed with the chemically adsorbed monomolecular film was dipped and held in the prepared oxidation treatment solution for 10 hours at room temperature. As a result, the C—Si bond of the dimethylsilyl group at the end of the long-chain hydrocarbon molecule of the chemically adsorbed monomolecular film was cut off, and a hydroxyl group instead was formed at the end of the long-chain hydrocarbon chain molecule of the film.

The substrate was again dipped and held in a solution containing $H(CH_3)_2Si(CH_2)_{18}(CH_3)_2SiCl$. The substrate was washed with chloroform and then with water, thus forming the second layer of a chemically adsorbed multilayer film. The conditions for preparing the above-noted solution and forming the second layer were the same as the previously described conditions applied for forming the first chemically adsorbed monomolecular film.

The group at the end of the long-chain hydrocarbon molecule was changed to a hydroxyl group by the oxidation treatment mentioned above. The substrate was then dipped and held in a solution containing $CF_3(CH_2)_{18}(CH_3)_2SiCl$, thus forming the third layer of the chemically adsorbed multilayer film (lubricating film).

The cross sectional view of the chemically adsorbed multilayer film (lubricating film) was the same as FIG. 1.

A sliding test was directed to the substrate surface formed with the lubricating film. A steel ball, weighted 100 grams, was slid on the surface in a range of 10 cm. Even though the sliding number was increased, the coefficient of dynamic friction remained the same, thus showing the effect of a durable lubricating film on the substrate surface. After forming a chemically adsorbed multilayer film (lubricating film) of the invention on the surface of a magnetic recording disc, a CSS test was directed to the disc. According to the test result, 200,000 repetitions of starting and stopping were cleared by the disc.

EXAMPLE 5

A high molecular binder filled with powder of iron oxide was shaped like a disc, and formed with a thin film of silicon oxide on its surface, thus providing a substrate of the example, having hydroxyl groups with numerous active hydrogens on the surface exposed for adsorption.

A solution was prepared by dissolving $CH_2=CH(CH_2)_{18}SiCl_3$—chemical admolecules having vinyl groups at one end and trichlorosilyl groups at another end of long-chain alkyl groups—into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box containing nitrogen gas with 5% or less relative humidity.

The substrate was dipped and held in the prepared solution for one hour at 23° C. in a dry atmosphere. A chemically adsorbed monomolecular film was then formed by the dehydrochlorination reaction between the chemical admolecules and the hydroxyl groups on the substrate surface.

In order to remove the chemical admolecules that were not chemically reacted but physically adsorbed to the substrate surface, the substrate was agitated and washed in chloroform for 15 minutes in a dry atmosphere. This process was repeated once.

The substrate was then washed with flowing extra-pure water for 15 minutes; as a result, the SiCl groups were reacted to neighbouring SiCl groups.

As a next step, the substrate was irradiated with an electron beam. The top side of the stainless steel (SUS) container was covered with aluminum foil, and was blanketed with nitrogen gas, thus preparing an apparatus used for an irradiation treatment. The substrate was irradiated with 300 keV acceleration voltage, 50 microampered electronic current, 1 atm gas-pressure and with 0.02 Gy/sec irradiation speed (absorbed dose rate) at room temperature for 100 seconds. As a result, the unsaturated groups at the end of long-chain hydrocarbon molecules (alkane groups in this example) were changed to imino and/or amino groups.

The second layer of a chemically adsorbed multilayer film was formed by dipping and holding the substrate having imino and/or amino groups at the end of the long-chain hydrocarbon molecules into a solution containing $CH_2=CH(CH_2)_{18}(CH_3)_2SiCl$. The conditions for preparing the solution and forming the second layer were the same as the previously mentioned conditions applied for forming the first chemically adsorbed monomolecular film.

The groups at the end of the long-chain hydrocarbon molecules were again changed to imino and/or amino groups by the above-mentioned irradiation treatment. The substrate was dipped and held in a solution containing $CF_3(CH_2)_{18}(CH_3)_2SiCl$, and washed with chloroform and then with flowing water, thus forming the third layer of the chemically adsorbed multilayer film (lubricating film).

The cross sectional view of the chemically adsorbed multilayer film (lubricating film) of the example is the same as FIG. 1.

A sliding test was directed to the substrate surface formed with the above-noted lubricating film. A steel ball, weighted 100 grams, was slid on the substrate surface in a range of 10 cm. Even though the sliding number was increased, the coefficient of dynamic friction remained the same, thus showing the effect of a durable lubricating film on the substrate surface. After forming a chemically adsorbed multilayer film (lubricating film) of the invention on the surface of a magnetic recording disc, a CSS test was directed to the disc. According to the test result, 200,000 repetitions of starting and stopping were cleared by the disc.

EXAMPLE 6

A high molecular binder filled with powder of iron oxide was shaped like a disc, and formed with a thin film of silicon oxide, thus providing a substrate 11, with hydroxyl groups containing numerous active hydrogens on the surface exposed for adsorption.

A solution was prepared by dissolving $H(CH_3)_2Si(CH_2)_{18}SiCl_3$—chemical admolecules having dimethylsilyl groups at one end and trichlorosilyl groups at another end of long chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

Substrate 11 was dipped and held in the prepared solution for one hour at 23° C. in a dry atmosphere. As a result, a chemically adsorbed monomolecular film 12 was formed by the dehydrochlorination reaction between the chemical admolecules and the hydroxyl groups on the substrate surface.

Substrate 11 was then washed with flowing extra-pure water for 15 minutes. As a result, the SiCl groups were reacted to neighbouring SiCl groups.

An oxidation treatment solution was prepared by the following procedures:
  dissolving 140 mg potassium fluoride (reaction accelerator) into 50 ml methanol and throughly agitating the solution at room temperature;
  dissolving 250 mg potassium hydrogen carbonate into 50 ml tetrahydrofuran, adding 25 ml hydrogen peroxide solution (30% by volume) and then throughly agitating the solution at room temperature;

mixing the above-noted two solutions, thus fixing the oxidation treatment solution.

Substrate 11 formed with chemically adsorbed monomolecular film 12 was dipped and held in the prepared oxidation treatment solution for 10 hours at room temperature. As a result, the C—Si bond of the dimethylsilyl group at the end of the long-chain hydrocarbon molecule of chemically adsorbed monomolecular film 12 was cut off, and a hydrocarbon group instead was formed at the end of the long-chain hydrocarbon chain molecule of the film.

Substrate 11 was again dipped and held in a solution containing $H(CH_3)_2Si(CH_2)_{18}(CH_3)_2SiCl$. The substrate was washed with chloroform and then with flowing water, thus forming the second layer 13 of a chemically adsorbed multilayer film. The conditions for preparing the above-noted solution and forming the second layer 13 were the same as the previously described conditions applied for forming the first chemically adsorbed monomolecular film.

The group at the end of the long-chain hydrocarbon molecule was changed to a hydroxyl group by the above-mentioned oxidation treatment. Substrate 11 was then dipped and held in a solution containing $CF_3(CH_2)_{18}(CH_3)_2SiCl$, thus forming the third layer 14 of the chemically adsorbed multilayer film.

Substrate 11 was dipped and held in a chloroform solution containing $CH_3(CF_2)_{17}CH_3$ at a concentration of 1.0 gram/liter. Both dipping and lifting speed was 1.5 mm/second. A thin film 15 (about 1 nanometer) of long-chain hydrocarbon molecules was formed on the surface of the chemically adsorbed multilayer film in a clean room atmosphere, thus forming a lubricating film of the example.

Figure 3:
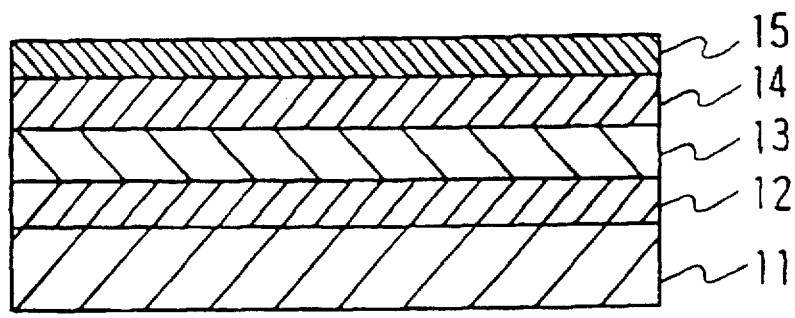
FIG. 3 is a cross sectional view of a lubricating film of Examples 6, 7, 8 and 9 according to the invention.

FIG. 3 shows the structure of the lubricating film.

A sliding test was directed to the substrate surface formed with the lubricating film. A steel ball, weighted 100 grams, was slid on the film in a range of 10 cm. Even though the sliding number was increased, the coefficient of dynamic friction remained the same, thus showing the effect of a durable lubricating film. After forming a chemically adsorbed multilayer film (lubricating film) of the example on the surface of a magnetic recording disc, a CSS test was directed to the disc. According to the test result, 200,000 repetitions of starting and stopping were cleared by the disc.

EXAMPLE 7

A high molecular binder filled with powder of iron oxide was shaped like a disc, and was formed with a thin film of silicon oxide on its surface, thus providing a substrate of the example, with hydroxyl groups containing numerous active hydrogens on the surface exposed for adsorption.

A solution was prepared by dissolving $CH_2=CH(CH_2)_{18}SiCl_3$—chemical admolecules having vinyl groups at one end and trichlorosilyl groups at another end of long-chain alkyl groups—into the mixed solvent of 80% by weight of hexadecane, 12% by weight of carbon tetrachloride and 8% by weight of chloroform at a concentration 1 millimol/liter in a dry atmosphere. The preparation of the solution was carried out in a glove box containing nitrogen gas with 5% or less relative humidity.

The substrate was dipped and held in the prepared solution for one hour at 23° C. in a dry atmosphere. A chemically adsorbed monomolecular film was then formed by the dehydrochlorination reaction between the chemical admolecules and the hydroxyl groups on the substrate surface.

The substrate was then washed with flowing extra-pure water for 15 minutes; as a result, the SiCl groups were reacted to neighbouring SiCl groups.

As a next step, the substrate was irradiated with an electron beam. The top side of the stainless steel (SUS) container was covered with aluminum foil, and was blanketed with nitrogen gas, thus preparing an apparatus used for an irradiation treatment. The substrate was irradiated with 300 keV acceleration voltage, 50 microamperes electronic current, 1 atm gas-pressure and with 0.02 Gy/sec irradiation speed (absorbed dose rate) at room temperature for 100 seconds. As a result, the unsaturated groups at the end of long chain hydrocarbon molecules (vinyl groups in this example) were changed to imino and/or amino groups.

The second layer of a chemically adsorbed multilayer film was formed by dipping and holding the substrate having imino and/or amino groups at the end of the long-chain hydrocarbon molecules into a solution containing $CH_2=CH(CH_2)_{18}(CH_3)_2SiCl$. The conditions for preparing the solution and forming the second layer were the same as the above-noted conditions applied for forming the first chemically adsorbed monomolecular film.

The irradiation treatment mentioned above was again directed to the substrate. The irradiated substrate was then dipped and held in a solution containing $CF_3(CH_2)_{18}(CH_3)_2SiCl$, thus forming the third layer of the chemically adsorbed multilayer film.

The substrate was then dipped and held in a chloroform solution containing $CH_3(CF_2)_{17}CH_3$ at a concentration of 1.0 gram/liter. Both dipping and lifting speed was 1.5 mm/second. The thin film (about 1 nanometer) of long-chain hydrocarbon molecules was formed on the surface of the chemically adsorbed multilayer film in a clean room atmosphere, thereby forming a lubricating film of the example.

The cross sectional view of the lubricating film was the same as FIG. 3.

A sliding test was directed to the substrate surface formed with the above-noted lubricating film. A steel ball, weighted 100 grams, was slid on the substrate surface in a range of 10 cm. Even though the sliding number was increased, the coefficient of dynamic friction remained the same, thus showing the effect of a durable lubricating film on the substrate surface. After forming a chemically adsorbed multilayer film (lubricating film) of the example on the surface of a magnetic recording disc, a CSS test was directed to the disc. According to the test result, 200,000 repetitions of starting and stopping were cleared by the disc.

EXAMPLE 8

A high molecular binder filled with powder of iron oxide was shaped like a disc, and formed with a thin film of silicon oxide, thus providing a substrate of the example, having hydroxyl groups containing numerous active hydrogens on the surface exposed for adsorption.

A solution was prepared by dissolving $H(CH_3)_2Si(CH_2)_{18}SiCl_3$—chemical admolecules having dimethylsilyl groups at one end and trichlorosilyl groups at another end of long chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

The substrate was then dipped and held in the prepared solution for one hour at 23° C. in a dry atmosphere. As a result, a chemically adsorbed monomolecular film was formed by the dehydrochlorination reaction between chemical admolecules and the hydroxyl groups on the substrate surface.

In order to remove the chemical admolecules that were not chemically reacted but physically adsorbed to the hydroxyl groups on the substrate surface, the substrate was agitated and washed in chloroform for 15 minutes in a dry atmosphere. This process was repeated once.

The substrate was then washed with flowing extra-pure water for 15 minutes. As a result, the SiCl groups were reacted to neighbouring SiCl groups.

An oxidation treatment solution was prepared by the following procedures:

dissolving 140 mg potassium fluoride (reaction accelerator) into 50 ml methanol and throughly agitating the solution at room temperature;

dissolving 250 mg potassium hydrogen carbonate into 50 ml tetrahydrofuran, adding 25 ml hydrogen peroxide solution (30% by volume) and then throughly agitating the solution at room temperature;

mixing the above-noted two solutions, thus fixing the oxidation treatment solution.

The substrate formed with the chemically adsorbed monomolecular film was dipped and held in the prepared oxidation treatment solution for 10 hours at room temperature. As a result, the C—Si bond of the dimethylsilyl group at the end of long-chain hydrocarbon molecule of the chemically adsorbed monomolecular film was cut off, and a hydroxyl group instead was formed at the end of the long-chain hydrocarbon chain molecule of the film.

The substrate was again dipped and held in a solution containing $H(CH_3)_2Si(CH_2)_{18}(CH_3)_2SiCl$. The substrate was washed with chloroform and then with flowing water, thus forming the second layer of a chemically adsorbed multilayer film. The conditions for preparing the above-noted solution and forming the second layer were the same as the above-mentioned conditions applied for forming the first chemically adsorbed monomolecular film.

The group at the end of the long-chain hydrocarbon molecule was changed to a hydroxyl group by the oxidation treatment mentioned above. The substrate was then dipped and held in a solution containing $CF_3(CH_2)_{18}(CH_3)_2SiCl$, and washed with chloroform and then with flowing water, thus forming the third layer of the chemically adsorbed multilayer film.

The substrate was then dipped and held in a chloroform solution containing $CH_3(CF_2)_{17}CH_3$ at a concentration of 1.0 gram/liter. Both dipping and lifting speed was 1.5 mm/second. The thin film (about 1 nanometer) of long-chain hydrocarbon molecules was formed on the surface of the chemically adsorbed multilayer film in a clean room atmosphere, thereby forming a lubricating film of the example.

The cross sectional view of the lubricating film was the same as FIG. 3.

A sliding test was directed to the substrate formed with the lubricating film. A steel ball, weighted 100 grams, was slid on the substrate in a range of 10 cm. Even though the sliding number was increased, the coefficient of dynamic friction stayed the same, thus showing the effect of a durable lubricating film on the substrate surface. After forming a chemically adsorbed multilayer film (lubricating film) of the invention on the surface of a magnetic recording disc, a CSS test was directed to the disc. According to the test result, 200,000 repetitions of starting and stopping were cleared by the disc.

EXAMPLE 9

A high molecular binder filled with powder of iron oxide was shaped like a disc, and formed with a thin film of silicon oxide, thus providing a substrate of the example, having hydroxyl groups containing numerous active hydrogens on the surface exposed for adsorption.

A solution was prepared by dissolving $CH_2=CH(CH_2)_{18}SiCl_3$—chemical admolecules having vinyl groups at one end and trichlorosilyl groups at another end of long chain alkyl groups—into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box containing nitrogen gas with 5% or less relative humidity.

The substrate was dipped and held in the prepared solution for one hour at 23° C. in a dry atmosphere. A chemically adsorbed monomolecular film was then formed by the dehydrochlorination reaction between the chemical admolecules and the hydroxyl groups on the substrate surface.

In order to remove the chemical admolecules that were not chemically reacted but physically adsorbed to the substrate, the substrate was agitated and washed in chloroform for 15 minutes in a dry atmosphere. This process was repeated once.

The substrate was then washed with flowing extra-pure water for 15 minutes; as a result, the SiCl groups were reacted to neighbouring SiCl groups.

As a next step, the substrate was irradiated with an electron beam. The top side of the stainless steel (SUS) container was covered with aluminum foil, and was blanketed with nitrogen gas, thus preparing an apparatus used for an irradiation treatment. The substrate was irradiated with 300 keV acceleration voltage, 50 microamperes electronic current, 1 atm gas-pressure and with 0.02 Gy/sec irradiation speed (absorbed dose rate) at room temperature for 100 seconds. As a result, the unsaturated groups at the end of long-chain hydrocarbon molecules (alkane groups in this example) were changed to imino and/or amino groups.

The second layer of a chemically adsorbed multilayer film was formed by dipping and holding the substrate having imino and/or amino groups at the end of the long-chain hydrocarbon molecules into a solution containing $CH_2=CH(CH_2)_{18}(CH_3)_2SiCl$. The conditions for preparing the solution and forming the second layer were the same as the above-mentioned conditions applied for forming the first chemically adsorbed monomolecular film.

The irradiation treatment described above was again directed to the substrate, thereby changing the groups at the end of the long-chain hydrocarbon molecules to imino and/or amino groups. The irradiated substrate was then dipped and held in a solution containing $CF_3(CH_2)_{18}(CH_3)_2SiCl$, and was washed with chloroform and then with flowing water, thus forming the third layer of the chemically adsorbed multilayer film.

Furthermore, the substrate was dipped and held in a chloroform solution containing $CH_3(CF_2)_{17}CH_3$ at a concentration of 1.0 gram/liter. Both dipping and lifting speed was 1.5 mm/second. The thin film (about 1 nanometer) of long-chain hydrocarbon molecules was formed on the surface of the chemically adsorbed multilayer film in a clean room atmosphere, thereby forming a lubricating film of the example.

The cross sectional view of the lubricating film was the same as FIG. 3.

A sliding test was directed to the substrate surface formed with the above-noted lubricating film. A steel ball, weighted 100 grams, was slid on the substrate surface in a range of 10 cm. Even though the sliding number was increased, the coefficient of dynamic friction remained the same, thus showing the effect of a durable lubricating film on the substrate surface. After forming a chemically adsorbed multilayer film (lubricating film) of the example on the surface of a magnetic recording disc, a CSS test was directed to the disc. According to the test result, 200,000 repetitions of starting and stopping were cleared by the disc.

EXAMPLE 10

A high molecular binder filled with powder of iron oxide was shaped like a disc, thus providing a substrate 21. The exposure of hydroxyl groups to the substrate surface was minimal, and there were only a small number of active hydrogens on the surface.

A solution was prepared by dissolving a low molecular chemical adsorbent—tetrachlorosilane ($SiCl_4$)—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

Substrate 21 was dipped and held in the prepared solution for one hour at 23° C. in a dry atmosphere. As a result, a low molecular chemically adsorbed layer 22 shown in Formula 10 was formed by the dehydrochlorination reaction between the chemical admolecules of the chemical adsorbent and the hydroxyl groups on the substrate surface.

Formula 10

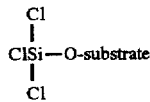

In order to remove the low molecular chemical adsorbent that was not chemically reacted but physically adsorbed to the hydroxyl groups on the substrate surface, substrate 21 was agitated and washed in chloroform for 15 minutes in a dry atmosphere.

Substrate 21 was then washed with flowing extra-pure water for 15 minutes. As a result, the SiCl groups of Formula 10 became SiOH groups.

A solution was prepared by dissolving $H(CH_3)_2Si(CH_2)_{18}SiCl_3$—chemical admolecules having dimethylsilyl groups at one end and trichlorosilyl groups at another end of long chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

Substrate 21 was dipped and held in the prepared solution for one hour at 23° C. in a dry atmosphere. As a result, a chemically adsorbed monomolecular film 23 shown in Formula 11 was formed by the dehydrochlorination reaction between the chemical admolecules and the hydroxyl groups on the substrate surface.

Formula 11

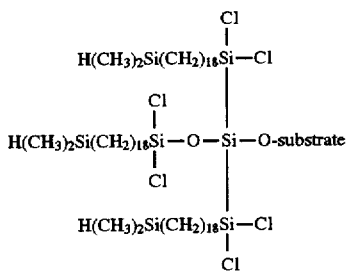

Substrate 21 was then washed with flowing extra-pure water for 15 minutes. As a result, the SiCl groups of Formula 11 were reacted to neighbouring SiCl groups.

An oxidation treatment solution was prepared by the following procedures:

dissolving 140 mg potassium fluoride (reaction accelerator) into 50 ml methanol and throughly agitating the solution at room temperature;

dissolving 250 mg potassium hydrogen carbonate into 50 ml tetrahydrofuran, adding 25 ml hydrogen peroxide solution (30% by volume) and then throughly agitating the solution at room temperature;

mixing the above-noted two solutions, thus fixing the oxidation treatment solution.

Substrate 21 formed with chemically adsorbed monomolecular film 23 was dipped and held in the prepared oxidation treatment solution for 10 hours at room temperature. As a result, the C—Si bond of the dimethylsilyl group at the end of the long chain hydrocarbon molecule of chemically adsorbed monomolecular film 23 was cut off, and a hydroxyl group instead was formed at the end of the long chain hydrocarbon molecule of chemically adsorbed monomolecular film 23.

Moreover, substrate 21, having OH groups at the end of the long-chain hydrocarbon molecules, was dipped and held in a solution containing $H(CH_3)_2Si(CH_2)_{18}(CH_3)_2SiCl$, thus forming the second layer 24 of a chemically adsorbed multilayer film. The conditions for preparing the solution and forming second layer 24 were the same as the above-mentioned condition applied for forming chemically adsorbed monomolecular film 23.

The group at the end of the long-chain hydrocarbon molecule was changed to a hydroxyl group by the oxidation treatment mentioned above. Furthermore, substrate 21 was dipped and held in a solution containing $CF_3(CH_2)_{18}(CH_3)_2SiCl$, thus forming the third layer 25 of the chemically adsorbed multilayer film (lubricating film).

Figure 4:
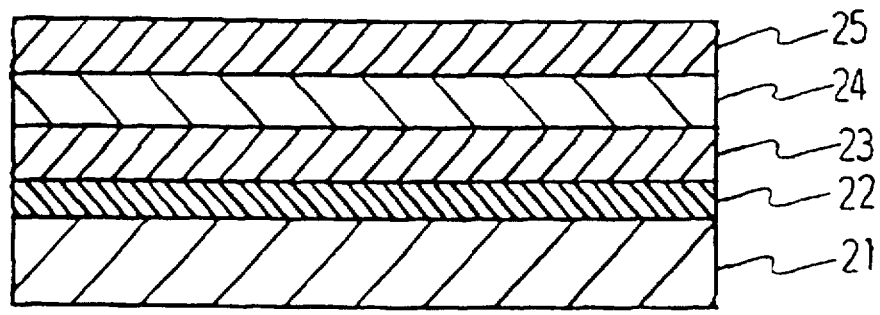
FIG. 4 is a cross sectional view of a lubricating film of Examples 10, 11, 12 and 13 according to the invention.

FIG. 4 shows a cross sectional view of the lubricating film of the example.

A sliding test was directed to substrate 21 formed with the lubricating film. A steel ball, weighted 100 grams, was slid on the substrate surface in a range of 10 cm. Even though the sliding number was increased, the coefficient of dynamic friction remained the same, thus showing the effect of a durable lubricating film on the substrate surface. After forming a chemically adsorbed multilayer film (lubricating film) of the example on the surface of a magnetic recording disc, a CSS test was directed to the disc. According to the test result, 200,000 repetitions of starting and stopping were cleared by the disc.

EXAMPLE 11

A high molecular binder filled with powder of iron oxide was shaped like a disc, thus providing a substrate of the example. The exposure of hydroxyl groups to the substrate surface was minimal, and there were only a small number of active hydrogens on the surface.

A solution was prepared by dissolving SiCl₄, a low molecular chemical adsorbent, into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box containing nitrogen gas with 5% or less relative humidity.

The substrate was dipped and held in the prepared solution for one hour at 23° C. in a dry atmosphere. A low molecular chemically adsorbed layer shown in Formula 12 was then formed by the dehydrochlorination reaction between the chemical adomolecules of the chemical adsorbent and the hydroxyl groups on the substrate surface.

Formula 12

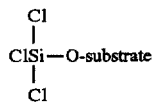

The substrate was then washed with flowing extra-pure water for 15 minutes. As a result, the SiCl groups of Formula 12 became SiOH groups.

A solution was prepared by dissolving CH₂=CH(CH₂)₁₈SiCl₃—chemical admolecules having vinyl groups at one end and trichlorosilyl groups at another end of long-chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was directed in a glove box containing nitrogen gas with 5% or less relative humidity.

The substrate was then dipped and held in the prepared solution for one hour at 23° C. in a dry atmosphere. As a result, a chemically adsorbed monomolecular film shown in Formula 13 was formed by the dehydrochlorination reaction between the chemical admolecules and the hydroxyl groups on the substrate surface.

Formula 13

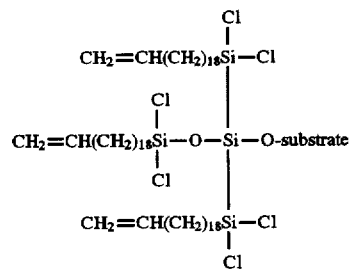

Moreover, the substrate was washed with flowing extra-pure water for 15 minutes. As a result, the SiCl groups of Formula 13 were reacted to neighboring SiCl groups.

As a next step, the substrate was irradiated with an electron beam. The top side of the stainless steel (SUS) container was covered with aluminum foil, and was blanketed with nitrogen gas, thus preparing an apparatus used for an irradiation treatment. The substrate was irradiated with 300 keV acceleration voltage, 50 microamperes electronic current, 1 atm gas-pressure and with 0.02 Gy/sec irradiation speed (absorbed dose rate) at room temperature for 100 seconds. As a result, the unsaturated groups at the end of the long-chain hydrocarbon molecules (vinyl groups in this example) were changed to imino and/or amino groups.

The second layer of a chemically adsorbed multilayer film was formed by dipping and holding the substrate having imino and/or amino groups at the end of the long-chain hydrocarbon molecules into a solution containing CH₂=CH (CH₂)₁₈(CH₃)₂SiCl. The conditions for preparing the solution and forming the second layer were the same as the above-mentioned conditions applied for forming the first chemically adsorbed film.

Furthermore, the groups at the end of the long-chain hydrocarbon molecules were again changed to imino and/or amino groups by the irradiation treatment mentioned above. The irradiated substrate was then dipped and held in a solution containing CF₃(CH₂)₁₈(CH₃)₂SiCl, thus forming the third layer of the chemically adsorbed multilayer film (lubricating film).

The cross sectional view of the chemically adsorbed multilayer film (lubricating film) of the example is the same as FIG. 4.

A sliding test was directed to the substrate surface formed with the above-noted lubricating film. A steel ball, weighted 100 grams, was slid on the substrate in a range of 10 cm. Even though the number of sliding was increased, the coefficient of dynamic friction remained the same, thus showing the effect of a durable lubricating film on the substrate surface. After forming a chemically adsorbed multilayer film (lubricating film) of the example on the surface of a magnetic recording disc, a CSS test was directed to the disc. According to the test result, 200,000 repetitions of starting and stopping were cleared by the disc.

EXAMPLE 12

A high molecular binder filled with powder of iron oxide was shaped like a disc, thus providing a substrate of the example. The exposure of hydroxyl groups to the substrate surface was minimal, and there were only a small number of active hydrogens on the surface.

A solution was prepared by dissolving SiCl₄, a low molecular chemical adsorbent, into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

The substrate was then dipped and held in the prepared solution for one hour in a dry atmosphere. As a result, a low molecular chemically adsorbed layer was formed by the dehydrochlorination reaction between the chemical admolecules of the chemical adsorbent and the hydroxyl groups on the substrate surface.

Moreover, the substrate was washed with flowing extra-pure water for 15 minutes, and the SiCl groups then became SiOH groups.

A solution was prepared by dissolving H(CH₃)₂Si(CH₂)₁₈SiCl₃—chemical admolecules having dimethysilyl groups at one end and trichlorosilyl groups at another end of long-chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

The substrate was then dipped and held in the prepared solution for one hour at 23° C. in a dry atmosphere. As a result, a chemically adsorbed monomolecular film was formed by the dehydrochlorination reaction between the chemical admolecules and the hydroxyl groups on the substrate surface.

In order to remove the low molecular chemical adsorbent that was not chemically reacted but physically adsorbed to the hydroxyl groups on the substrate surface, the substrate surface was agitated and washed in chloroform for 15 minutes in a dry atmosphere. This procedure was repeated once.

Moreover, the substrate was washed with flowing extra-pure water for 15 minutes. As a result, the SiCl groups were reacted to neighboring SiCl groups.

An oxidation treatment solution was prepared in the following procedures:

dissolving 140 mg potassium fluoride (reaction accelerator) into 50 ml methanol and throughly agitating the solution at room temperature;

dissolving 250 mg potassium hydrogen carbonate into 50 ml tetrahydrofuran, adding 25 ml hydrogen peroxide solution (30% by volume) and then throughly agitating the solution at room temperature;

mixing the above-noted two solutions, thus fixing the oxidation treatment solution.

The substrate formed with the chemically adsorbed monomolecular film mentioned above was dipped and held in the prepared oxidation treatment solution for 10 hours at room temperature. As a result, the C—Si bond of dimethylsilyl group at the end of the long-chain hydrocarbon molecule of the chemically adsorbed monomolecular film was cut off, and a hydrocarbon group instead was formed at the end of the long-chain hydrocarbon molecule of the film.

The substrate having OH groups at the end of the long-chain hydrocarbon molecule was again dipped and held in a solution containing $H(CH_3)_2Si(CH_2)_{18}(CH_3)_2SiCl$, thus forming the second layer of a chemically adsorbed multilayer film. The conditions for preparing the solution and forming the second layer were the same as the conditions applied for the first chemically adsorbed monomolecular film.

The group at the end of the long-chain hydrocarbon molecule was changed to a hydroxyl group by the above-noted oxidation treatment. The substrate was then dipped and held in a solution containing $CF_3(CH_2)_{18}(CH_3)_2SiCl$, thus forming the third layer of the chemically adsorbed multilayer film (lubricating film).

The cross sectional view of the lubricating film was the same as FIG. 4.

A sliding test was directed to the substrate surface formed with the lubricating film. A steel ball, weighted 100 grams, was slid on the substrate in a range of 10 cm. Even though the number of sliding was increased, the coefficient of dynamic friction remained the same, thus showing the effect of a durable lubricating film on the substrate surface. After forming a chemically adsorbed multilayer film (lubricating film) of the example on the surface of a magnetic recording disc, a CSS test was directed to the disc. According to the test result, 200,000 repetitions of starting and stopping were cleared by the disc.

EXAMPLE 13

A high molecular binder filled with powder of iron oxide was shaped like a disc, thus providing a substrate of the example. The exposure of hydroxyl groups to the substrate surface was minimal, and there were only a small number of active hydrogens on the surface.

A solution was prepared by dissolving $SiCl_4$, a low molecular chemical adsorbent, into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box containing nitrogen gas with 5% or less relative humidity.

The substrate was dipped and held in the prepared solution for one hour at 23° C. in a dry atmosphere. A low molecular chemically adsorbed layer was then formed by the dehydrochlorination reaction between the chemical admolecules and the hydroxyl groups on the substrate surface.

In order to remove the low molecular chemical adsorbent that was not chemically reacted but physically adsorbed to the substrate, the substrate was agitated and washed in chloroform for 15 minutes in a dry atmosphere. This process was repeated once.

Furthermore, the substrate was washed with flowing extra-pure water for 15 minutes; as a result, the SiCl groups became SiOH groups.

A solution was prepared by dissolving $CH_2=CH(CH_2)_{18}SiCl_3$— chemical admolecules having vinyl groups at one end and trichlorosilyl groups at another end of long-chain alkyl groups—into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box containing nitrogen gas with 5% or less relative humidity.

The substrate was dipped and held in the prepared solution for one hour at 23° C. in a dry atmosphere. A chemically adsorbed monomolecular film was then formed by the dehydrochlorination reaction between the chemical admolecules and the hydroxyl groups on the substrate surface.

Moreover, in order to remove the chemical admolecules that were not chemically reacted but physically adsorbed to the substrate, the substrate was agitated and washed in chloroform for 15 minutes in a dry atmosphere. This process was repeated once.

The substrate was then washed with flowing extra-pure water for 15 minutes; as a result, the SiCl groups were reacted to neighbouring SiCl groups.

As a next step, the substrate was irradiated with an electron beam. The top side of the stainless steel (SUS) container was covered with aluminum foil, and was blanketed with nitrogen gas, thus preparing an apparatus used for an irradiation treatment. The substrate was irradiated with 300 keV acceleration voltage, 50 microamperes electronic current, 1 atm gas-pressure and with 0.02 Gy/sec irradiation speed (absorbed dose rate) at room temperature for 100 seconds. As a result, the unsaturated groups at the end of long-chain hydrocarbon molecules (alkane groups in this example) were changed to imino and/or amino groups.

The second layer of a chemically adsorbed multilayer film was formed by dipping and holding the substrate, having imino and/or amino groups at the end of the long-chain hydrocarbon molecules, into a solution containing $CH_2=CH(CH_2)_{18}(CH_3)_2SiCl$. The conditions of preparing the solution and forming the second layer were the same as the conditions applied for forming the first chemically adsorbed monomolecular film.

Furthermore, the groups at the end of the long-chain hydrocarbon molecules were again changed to imino and/or amino groups by the above-mentioned irradiation treatment. The irradiated substrate was then dipped and held in a solution containing $CF_3(CH_2)_{18}(CH_3)_2SiCl$, thus forming the third layer of the chemically adsorbed multilayer film (lubricating film).

The cross sectional view of the lubricating film was the same as FIG. 4.

A sliding test was directed to the substrate surface formed with the above-noted lubricating film. A steel ball, weighted 100 grams, was slid on the substrate in a range of 10 cm. Even though the number of sliding was increased, the coefficient of dynamic friction remained the same, thus showing the effect of a durable lubricating film on the substrate surface. After forming a chemically adsorbed multilayer film (lubricating film) of the example on the surface of a magnetic recording disc, a CSS test was directed to the disc. According to the test result, 200,000 repetitions of starting and stopping were cleared by the disc.

EXAMPLE 14

A high molecular binder filled with powder of iron oxide was shaped like a disc, thus providing a substrate 31 of the example. The exposure of hydroxyl groups to the substrate surface was minimal, and there were only a small number of active hydrogens on the surface.

A solution was prepared by dissolving $SiCl_4$, a low molecular chemical adsorbent, into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

Substrate 31 was dipped and held in the prepared solution for one hour at 23° C. in a dry atmosphere. As a result, a low molecular chemically adsorbed layer 32 was formed by the dehydrochlorination reaction between the chemical admolecules of the chemical adsorbent and the hydroxyl groups on the substrate surface.

Substrate 31 was then washed with flowing extra-pure water for 15 minutes. As a result the SiCl groups became SiOH groups.

Moreover, a solution was prepared by dissolving $H(CH_3)_2Si(CH_2)_{18}SiCl_3$—chemical admolecules having dimethylsilyl groups at one end and trichlorosilyl groups at another end of long chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

Substrate 31 was dipped and held in the prepared solution for one hour at 23° C. in a dry atmosphere. As a result, a chemically adsorbed monomolecular film 33 was formed by the dehydrochlorination reaction between the chemical admolecules and the hydroxyl groups on the substrate surface.

Substrate 31 was then washed with flowing extra-pure water for 15 minutes. As a result, the SiCl groups were reacted to neighboring SiCl groups.

Furthermore, an oxidation treatment solution was prepared in the following procedures:

dissolving 140 mg potassium fluoride (reaction accelerator) into 50 ml methanol and throughly agitating the solution at room temperature;

dissolving 250 mg potassium hydrogen carbonate into 50 ml tetrahydrofuran, adding 25 ml hydrogen peroxide solution (30% by volume) and then throughly agitating the solution at room temperature;

mixing the above-noted two solutions, thus fixing the oxidation treatment solution.

Substrate 31 formed with chemically adsorbed monomolecular film 33 was dipped and held in the prepared oxidation treatment solution for 10 hours at room temperature. As a result, the C—Si bond of dimethylsilyl group at the end of the long-chain hydrocarbon molecule of the chemically adsorbed monomolecular film was cut off, and a hydroxyl group instead was formed at the end of the long-chain hydrocarbon chain molecule of the film.

Moreover, substrate 31 was dipped and held in a solution containing $H(CH_3)_2Si(CH_2)_{18}(CH_3)_2SiCl$, thus forming the second layer 34 of a chemically adsorbed multilayer film. The conditions for preparing the solution and forming the second layer were the same as the above-noted conditions applied for forming the first chemically adsorbed monomolecular film.

The group at the end of the long-chain hydrocarbon molecule was changed to a hydroxyl group by the oxidation treatment mentioned above. Substrate 31 was then dipped and held in a solution containing $CF_3(CH_2)_{18}(CH_3)_2SiCl$, thus forming the third layer 35 of the chemically adsorbed multilayer film.

Substrate 31 was again dipped and held in a chloroform solution containing $CH_3(CF_2)_{17}CH_3$ at a concentration of 1.0 gram/liter. Both dipping and lifting speed was 1.5 mm/second. A thin film 36 (about 1 nanometer) of long-chain hydrocarbon molecules was formed on the surface of the above-mentioned chemically adsorbed multilayer film in a clean room atmosphere, thus forming a lubricating film of the example.

Figure 5:
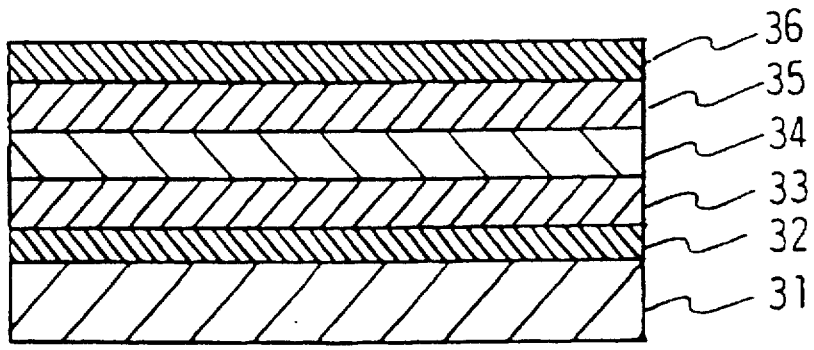
FIG. 5 is a cross sectional view of a lubricating film of Examples 14, 15, 16 and 17 according to the invention.

FIG. 5 shows a cross sectional view of the lubricating film of the example.

A sliding test was directed to the substrate surface formed with the lubricating film. A steel ball, weighted 10 grams, was slid on the substrate in a range of 10 cm. Even though the number of sliding was increased, the coefficient of dynamic friction remained the same, thus showing the effect of a durable lubricating film on the substrate surface. After forming a chemically adsorbed multilayer film (lubricating film) of the example on the surface of a magnetic recording disc, a CSS test was directed to the disc. According to the test result, 200,000 repetitions of starting and stopping were cleared by the disc.

EXAMPLE 15

A high molecular binder filled with powder of iron oxide was shaped like a disc, thus providing a substrate of the example. The exposure of hydroxyl groups to the substrate surface was minimal, and there were only a small number of active hydrogens on the surface.

A solution was prepared by dissolving $SiCl_4$, a low molecular chemical adsorbent, into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box containing nitrogen gas with 5% or less relative humidity.

The substrate was dipped and held in the prepared solution for one hour at 23° C. in a dry atmosphere. A low molecular chemically adsorbed layer was then formed by the dehydrochlorination reaction between the chemical admolecules of the chemical adsorbent and the hydroxyl groups on the substrate surface.

The substrate was then washed with flowing extra-pure water for 15 minutes; as a result, the SiCl groups became SiOH groups.

Moreover, a solution was prepared by dissolving $CH_2$=$CH(CH_2)_{18}SiCl_3$—chemical admolecules having vinyl groups at one end and trichlorosilyl groups at another end of long-chain alkyl groups—into the mixed solvent of 80% by weight of hexadecane, 12% by weight of carbon tetrachloride and 8% by weight of chloroform at a concentration of 1 millimole/liter in a dry atmosphere. The preparation of the solution was carried out in a glove box containing nitrogen gas with 5% or less relative humidity.

The substrate was dipped and held in the prepared solution for one hour at 23° C. in a dry atmosphere. A chemically adsorbed monomolecular film was then formed by the dehydrochlorination reaction between the chemical admolecules and the hydroxyl groups on the substrate surface.

In order to remove the chemical admolecules that were not chemically reacted but physically adsorbed to the substrate surface, the substrate was agitated and washed in chloroform for 15 minutes in a dry atmosphere. This process was repeated once.

The substrate was then washed with flowing extra-pure water for 15 minutes; as a result, the SiCl groups were reacted to neighbouring SiCl groups.

As a next step, the substrate was irradiated with an electron beam. The top side of the stainless steel (SUS) container was covered with aluminum foil, and was blanketed with nitrogen gas, thus preparing an apparatus used for an irradiation treatment. The substrate was irradiated with 300 keV acceleration voltage, 50 microamperes electronic current, 1 atm gas-pressure and with 0.02 Gy/sec irradiation speed (absorbed dose rate) at room temperature for 100 seconds. As a result, the unsaturated groups at the end of long-chain hydrocarbon molecules (alkane groups in this example) were changed to imino and/or amino groups.

The second layer of a chemically adsorbed multilayer film was formed by dipping and holding the substrate, having imino and/or amino groups at the end of the long-chain hydrocarbon molecules, into a solution containing $CH_2$=$CH(CH_2)_{18}(CH_3)_2SiCl$. The conditions for preparing the solution and forming the second layer were the same as the above-mentioned conditions applied for forming the first chemically adsorbed monomolecular film.

The groups at the end of the long-chain hydrocarbon molecules were again changed to imino and/or amino groups by the above-noted irradiation treatment. The irradiated substrate was then dipped and held in a solution containing $CF_3(CH_2)_{18}(CH_3)_2SiCl$, thus forming the third layer of the chemically adsorbed multilayer film.

Furthermore, the substrate was dipped and held in a chloroform solution containing $CH_3(CF_2)_{17}CH_3$ at a concentration of 1.0 gram/liter. Both dipping and lifting speed was 1.5 mm/second. As a result, a thin film (about 1 nanometer) of long-chain hydrocarbon molecules was formed on the surface of the chemically adsorbed multilayer film in a clean room atmosphere, thus forming a lubricating film of the example.

The cross sectional view of the lubricating film was the same as FIG. 5.

A sliding test was directed to the substrate surface formed with the above-noted lubricating film. A steel ball, weighted 100 grams, was slid on the substrate in a range of 10 cm. Even though the number of sliding was increased, the coefficient of dynamic friction remained the same, thus showing the effect of a durable lubricating film on the substrate surface. After forming a chemically adsorbed multilayer film (lubricating film) of the example on the surface of a magnetic recording disc, a CSS test was directed to the disc. According to the test result, 200,000 repetitions of starting and stopping were cleared by the disc.

EXAMPLE 16

A high molecular binder filled with powder of iron oxide was shaped like a disc, thus providing a substrate of the example. The exposure of hydroxyl groups to the substrate surface was minimal, and there were only a small number of active hydrogens on the surface.

A solution was prepared by dissolving $SiCl_4$, a low molecular chemical adsorbent, into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

The substrate was dipped and held in the prepared solution for one hour at 23° C. in a dry atmosphere. As a result, a low molecular chemically adsorbed layer was formed by the dehydrochlorination reaction between the chemical admolecules of the chemical adsorbent and the hydroxyl groups on the substrate surface.

The substrate was then washed with flowing extra-pure water for 15 minutes. As a result, the SiCl groups became SiOH groups.

Moreover, a solution was prepared by dissolving $H(CH_3)_2Si(CH_2)_{18}SiCl_3$—chemical admolecules having dimethylsilyl groups at one end and trichlorosilyl groups at another end of long chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

The substrate was then dipped and held in the prepared solution for one hour at 23° C. in a dry atmosphere. As a result, a chemically adsorbed monomolecular film was formed by the dehydrochlorination reaction between the chemical admolecules and the hydroxyl groups on the substrate surface.

In order to remove the low molecular chemical adsorbent that was not chemically reacted but physically adsorbed to the substrate surface, the substrate was agitated and washed in chloroform for 15 minutes in a dry atmosphere. This procedure was repeated once.

The substrate was then washed with flowing extra-pure water for 15 minutes. As a result, the SiCl groups were reacted to neighbouring SiCl groups.

An oxidation treatment solution was prepared in the following procedures:

dissolving 140 mg potassium fluoride (reaction accelerator) into 50 ml methanol and throughly agitating the solution at room temperature;

dissolving 250 mg potassium hydrogen carbonate into 50 ml tetrahydrofuran, adding 25 ml hydrogen peroxide solution (30% by volume) and then throughly agitating the solution at room temperature;

mixing the above-noted two solutions, thus fixing the oxidation treatment solution.

The substrate formed with the chemically adsorbed monomolecular film was dipped and held in the prepared oxidation treatment solution for 10 hours at room temperature. As a result, the C—Si bond of dimethylsilyl groups at the end of the long-chain hydrocarbon molecules of the chemically adsorbed monomolecular film was cut off, and a hydroxyl group instead was formed at the end of the long-chain hydrocarbon chain molecules of the film.

The substrate, having OH groups at the end of the long-chain hydrocarbon molecules, was again dipped and held in a solution containing $H(CH_3)_2Si(CH_2)_{18}(CH_3)_2SiCl$, thus forming the second layer of a chemically adsorbed multilayer film. The conditions for preparing the solution and forming the second layer were the same as the conditions applied for forming the first chemically adsorbed monomolecular film.

The group at the end of the long-chain hydrocarbon molecule was changed to a hydroxyl group by the oxidation treatment described above. The substrate was then dipped and held in a solution containing $CF_3(CH_2)_{18}(CH_3)_2SiCl$, thus forming the third layer of the chemically adsorbed multilayer film.

Furthermore, the substrate was dipped and held in a chloroform solution containing $CH_3(CF_2)_{17}CH_3$ at a concentration of 1.0 gram/liter. Both dipping and lifting speed was 1.5 mm/second. As a result, a thin film (about 1 nanometer) of long-chain hydrocarbon molecules was formed on the surface of the chemically adsorbed multilayer film in a clean room atmosphere, thus forming a lubricating film of the example.

The cross sectional view of the lubricating film was the same as FIG. 5.

A sliding test was directed to the substrate surface formed with the lubricating film. A steel ball, weighted 100 grams, was slid on the substrate in a range of 10 cm. Even though the number of sliding was increased, the coefficient of dynamic friction remained the same, thus showing the effect of a durable lubricating film on the substrate surface. After forming a chemically adsorbed multilayer film (lubricating film) of the example on the surface of a magnetic recording disc, a CSS test was directed to the disc. According to the test result, 200,000 repetitions of starting and stopping were cleared by the disc.

EXAMPLE 17

A high molecular binder filled with powder of iron oxide was shaped like a disc, thus providing a substrate of the example. The exposure of hydroxyl groups to the substrate surface was minimal, and there were only a small number of active hydrogens on the surface.

A solution was prepared by dissolving $SiCl_4$, a low molecular chemical adsorbent, into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box containing nitrogen gas with 5% or less relative humidity.

The substrate was dipped and held in the prepared solution for one hour at 23° C. in a dry atmosphere. A low molecular chemically adsorbed layer was then formed by the dehydrochlorination reaction between the chemical admolecules of the chemical adsorbent and the hydroxyl groups on the substrate surface.

In order to remove the low molecular chemical adsorbent that was not chemically reacted but physically adsorbed to the substrate surface, the substrate was agitated and washed in chloroform for 15 minutes in a dry atmosphere. This process was repeated once.

The substrate was then washed with flowing extra-pure water for 15 minutes; as a result, the SiCl groups became SiOH groups.

Moreover, a solution was prepared by dissolving $CH_2=CH(CH_2)_{18}SiCl_3$—chemical admolecules having vinyl groups at one end and trichlorosilyl groups at another end of long chain alkyl groups—into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box containing nitrogen gas with 5% or less relative humidity.

The substrate was dipped and held in the prepared solution for one hour at 23° C. in a dry atmosphere. A chemically adsorbed monomolecular film was then formed by the dehydrochlorination reaction between the chemical admolecules and the hydroxyl groups on the substrate surface.

In order to remove the chemical admolecules that were not chemically reacted but physically adsorbed to the substrate surface, the substrate was agitated and washed in chloroform for 15 minutes in a dry atmosphere. This process was repeated once.

The substrate was then washed with flowing extra-pure water for 15 minutes; as a result, the SiCl groups were reacted to neighbouring SiCl groups.

As a next step, the substrate was irradiated with an electron beam. The top side of the stainless steel (SUS) container was covered with aluminum foil, and was blanketed with nitrogen gas, thus preparing an apparatus used for an irradiation treatment. The substrate was irradiated with 300 keV acceleration voltage, 50 microamperes electronic current, 1 atm gas-pressure and with 0.02 Gy/sec irradiation speed (absorbed dose rate) at a room temperature for 100 seconds. As a result, the unsaturated groups at the end of long-chain hydrocarbon molecules (vinyl groups in this example) were changed to imino and/or amino groups.

The second layer of a chemically adsorbed multilayer film was formed by dipping and holding the substrate, having imino groups at the end of the long-chain hydrocarbon molecules, into a solution containing $CH_2=CH(CH_2)_{18}(CH_3)_2SiCl$. The conditions for preparing the solution and forming the second layer were the same as the conditions applied for forming the first chemically adsorbed monomolecular film.

The groups at the end of the long-chain hydrocarbon molecules were again changed to imino and/or amino groups by the irradiation treatment mentioned above. The irradiated substrate was then dipped and held in a solution containing $CF_3(CH_2)_{18}(CH_3)_2SiCl$, thus forming the third layer of the chemically adsorbed multilayer film.

Furthermore, the substrate was dipped and held in a chloroform solution containing $CH_3(CF_2)_{17}CH_3$ at a concentration of 1.0 gram/liter. Both dipping and lifting speed was 1.5 mm/second. As a result, a thin film (about 1 nanometer) of long-chain hydrocarbon molecules was formed on the surface of the chemically adsorbed multilayer film in a clean room atmosphere, thus forming a lubricating film of the example.

The cross sectional view of the lubricating film was the same as FIG. 5.

A sliding test was directed to the substrate surface formed with the lubricating film. A steel ball, weighted 100 grams, was slid on the substrate in a range of 10 cm. Even though the number of sliding was increased, the coefficient of dynamic friction remained the same, thus showing the effect of a durable lubricating film on the substrate surface. After forming a chemically adsorbed multilayer film (lubricating film) of the example on the surface of a magnetic recording disc, a CSS test was directed to the disc. According to the

29 test result, 200,000 repetitions of starting and stopping were cleared by the disc.

EXAMPLE 18

Glass was used as a substrate 41 of the example. Substrate 41 was washed with an organic solution called acetone, thereby treating the surface of the substrate to have exposed numerous hydroxyl groups.

A solution was prepared by dissolving $H(CH_3)_2Si(CH_2)_{18}SiCl_3$—chemical admolecules having dimethylsilyl groups at one end and trichlorosilyl groups at another end of a long-chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

Substrate 41 was then dipped and held in the prepared solution for one hour at 23° C. in a dry atmosphere. As a result, a chemically adsorbed monomolecular film 42 was formed by the dehydrochlorination reaction between the chemical admolecules and the hydroxyl groups on the substrate surface.

Substrate 41 was then washed with flowing extra-pure water for 15 minutes. As a result, the SiCl groups were reacted to neighbouring SiCl groups.

An oxidation treatment solution was prepared in the following procedures:

dissolving 140 mg potassium fluoride (reaction accelerator) into 50 ml methanol and throughly agitating the solution at room temperature;

dissolving 250 mg potassium hydrogen carbonate into 50 ml tetrahydrofuran, adding 25 ml hydrogen peroxide solution (30% by volume) and then throughly agitating the solution at room temperature;

mixing the above-noted two solutions, thus fixing the oxidation treatment solution.

Substrate 41 formed with chemically adsorbed monomolecular film 42 was dipped and held in the prepared oxidation treatment solution for 10 hours at room temperature. As a result, the C—Si bond of dimethylsilyl group at the end of the long-chain hydrocarbon molecule of the chemically adsorbed monomolecular film was cut off, and a hydroxyl group instead was formed at the end of the long-chain hydrocarbon molecule of the film.

Substrate 41, having OH groups at the end of the long-chain hydrocarbon molecules, was again dipped and held in a solution containing $H(CH_3)_2Si(CH_2)_{18}(CH_3)_2SiCl$, thus forming the second layer 43 of a chemically adsorbed multilayer film. The condition for preparing the solution and forming second layer 43 were the same as the conditions applied for forming chemically adsorbed monomolecular film 42.

The group at the end of the long-chain hydrocarbon molecule was change to a hydroxyl group by the oxidation treatment mentioned above. Substrate 41 was then dipped and held in a solution containing $CF_3(CH_4)_{18}(CH_3)_2SiCl$, thus forming the third layer 44 of the chemically adsorbed multilayer film.

Figure 6:
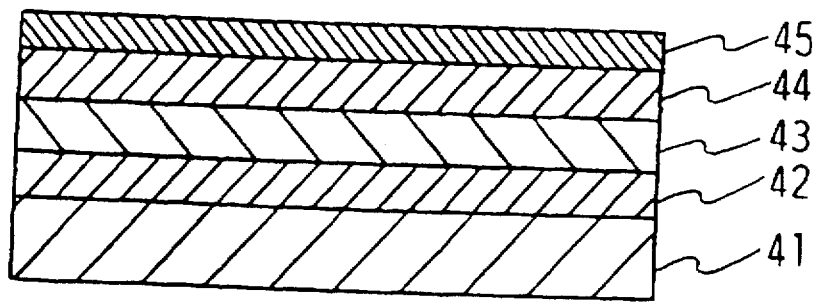
FIG. 6 is a cross sectional view of a lubricating film of Example 18 according to the invention.

A lubricating film of the example was formed by building up a thin film 45 of long-chain hydrocarbon molecules on the chemically adsorbed multilayer film. FIG. 6 shows the cross sectional view of the lubricating film. 5,000 times of sliding were directed on the lubricating film, and its coefficient of the dynamic friction was less than 0.1.

EXAMPLE 19

A high molecular binder filled with powder of iron oxide was shaped like a disc, and was formed with a thin film of silicon oxide on its surface, thus providing a substrate 51, having hydroxyl groups with numerous active hydrogens on the surface exposed for adsorption.

A solution was prepared by dissolving $CH_2=CH(CH_2)_{18}SiCl_3$—chemical admolecules having vinyl groups at one end and trichlorosilyl groups at another end of long-chain alkyl groups—into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box containing nitrogen gas with 5% or less relative humidity.

Substrate 51 was dipped and held in the prepared solution for one hour at 23° C. in a dry atmosphere. A chemically adsorbed monomolecular film 52 was then formed by the dehydrochlorination reaction between the chemical admolecules and the hydroxyl groups on the substrate surface.

In order to remove the chemical admolecules that were not chemically reacted but physically adsorbed to the substrate surface, substrate 51 was agitated and washed in chloroform for 15 minutes in a dry atmosphere. This process was repeated once.

Substrate 51 was then washed with flowing extra-pure water for 15 minutes; as a result, the SiCl groups were reacted to neighbouring SiCl groups.

As a next step, substrate 51 was irradiated with an electron beam. The top side of the stainless steel (SUS) container was covered with aluminum foil, and was blanketed with nitrogen gas, thus preparing an apparatus used for an irradiation treatment. Substrate 51 was irradiated with 300 keV acceleration voltage, 50 microamperes electronic current, 1 atm gas-pressure and with 0.02 Gy/sec irradiation speed (absorbed dose rate) at room temperature for 100 seconds. As a result, the unsaturated groups at the end of long-chain hydrocarbon molecules (alkane groups in this example) were changed to imino and/or amino groups.

Moreover, a solution was prepared by dissolving chemical admolecules—$CF_3(CF_2)_6(CH_2)_3(CH_3)_2SiCl$, having numerous fluorocarbon groups at one end and monochlorosilyl groups at another end of long-chain alkyl groups, and $CH_3(CH_2)_{18}(CH_3)_2SiCl$, having methyl groups at one end and monochlorosilyl groups at another end of long-chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box containing nitrogen gas with 5% or less relative humidity.

Substrate 51 formed with chemically adsorbed monomolecular film 52 was dipped and held in the prepared solution for one hour at 23° C. in a dry atmosphere. As a result, a chemically adsorbed monomolecular film 53, in which two kinds of chemical admolecules shown in Formulas 14 and 15 were uniformly adsorbed to the surface of chemically adsorbed monomolecular film 52, was formed by the dehydrochlorination reaction between the chemical admolecules and the imino groups on the surface of chemically adsorbed monomolecular film 52.

Formula 14

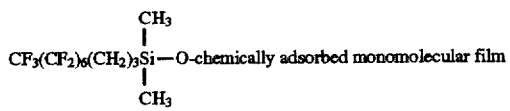

Formula 15

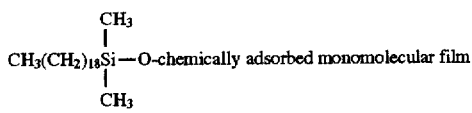

Unreacted chemical admolecules were removed by the following procedures:

dipping and holding substrate 51 in chloroform for twenty minutes in a dry atmosphere;

repeating the above-noted procedure;

placing substrate 51 in a dry atmosphere and vaporizing chloroform.

Substrate 51 was then washed with flowing extrapure water for 15 minutes.

Figure 7:
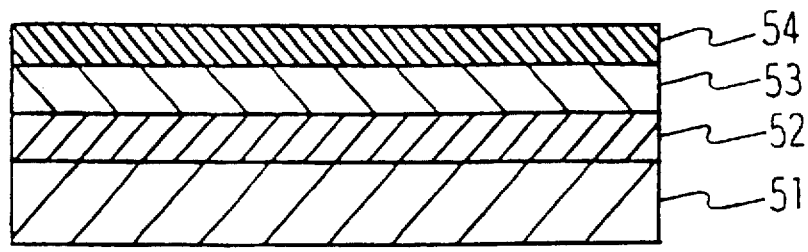
FIG. 7 is a cross sectional view of a lubricating film of Example 19 according to the invention.

Moreover, substrate 51 was dipped and held in a chloroform solution containing $CH_3(CF_2)_{17}CH_3$ at a concentration of 1.0 gram/liter. Both dipping and lifting speed was 1.5 mm/second. As a result, a thin film 54 (about 1 nanometer) of long-chain hydrocarbon was formed on the surface of the chemically adsorbed multilayer film in a clean room atmosphere, thus forming a lubricating film of the example. FIG. 7 shows the cross sectional view of the lubricating film.

After forming a lubricating film of the example on the surface of a magnetic recording disc, CSS test was directed to the disc. According to the test result, 200,000 repetitions of starting and stopping were cleared by the disc.

EXAMPLE 20

A high molecular binder filled with powder of iron oxide was shaped like a disc, and was formed with the thin film of silicon oxide on its surface, thus providing a substrate 61 having hydroxyl groups containing numerous active hydrogens on the surface exposed for adsorption.

A solution was prepared by dissolving $CH_2=CH(CH_2)_{18}SiCl_3$—chemical admolecules having vinyl groups at one end and trichlorosilyl groups at another end of long-chain alkyl groups—into the mixed solvent of 80% by weight of hexadecane, 12% by weight of carbon tetrachloride and 8% by weight of chloroform at a concentration of 1 millimol/liter in a dry atmosphere. The preparation of the solution was carried out in a glove box containing nitrogen gas with 5% or less relative humidity.

Substrate 61 was dipped and held in the prepared solution for one hour at 23° C. in a dry atmosphere. A chemically adsorbed film 62 was formed by the dehydrochlorination reaction between the chemical admolecules and the hydroxyl groups on the substrate surface.

In order to remove the chemical admolecules that were not chemically reacted but physically adsorbed to the substrate, the substrate surface was washed with chloroform for 15 minutes in a dry atmosphere. This process was repeated once.

Substrate 61 was then washed with flowing extra-pure water for 15 minutes; as a result, the SiCl groups were reacted to neighbouring SiCl groups.

As a next step, substrate 61 was irradiated with an electron beam. The top side of the stainless steel (SUS) container was covered with aluminum foil, and was blanketed with nitrogen gas, thus preparing an apparatus used for an irradiation treatment. Substrate 61 was irradiated with 300 keV acceleration voltage, 50 microamperes electronic current, 1 atm gas-pressure and with 0.02 Gy/sec irradiation speed (absorbed dose rate) at room temperature for 100 seconds. As a result, the unsaturated groups at the end of long-chain hydrocarbon molecules (alkane groups in this example) were changed to imino and/or amino groups.

A solution was prepared by dissolving chemical admolecules—having numerous fluorocarbon groups at one end of long-chain alkyl groups, methyl groups at the end of side chains and trichlorosilyl groups at another end of the long-chain alkyl groups shown in Formula 16—into the mixed solvent of 80% by weight of hexadecane, 12% by weight of carbon tetrachloride and 8% by weight of chloroform at a concentration of 1 millimol/liter in a dry atmosphere. The preparation of the solution was directed in a glove box with 5% or less relative humidity.

Formula 16

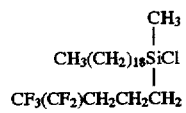

Substrate 61 formed with chemically adsorbed monomolecular film 62 was dipped and held in the prepared solution for one hour at 23° C. in a dry atmosphere. As a result, a chemically adsorbed monomolecular film 63 shown in Formula 17 was formed by the dehydrochlorination reaction between the chemical admolecules and the imino and/or amino groups on the surface of chemically adsorbed monomolecular film 62.

Formula 17

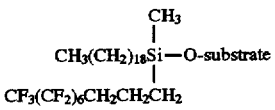

Unreacted chemical admolecules were removed from the substrate surface by the following procedures:

dipping and holding the substrate in chloroform for 20 minutes in a dry atmosphere;

repeating the above-noted procedure;

placing substrate 61 in a dry atmosphere and vaporizing chloroform in the atmosphere.

Substrate 61 was then washed with flowing extrapure water for 15 minutes.

Figure 8:
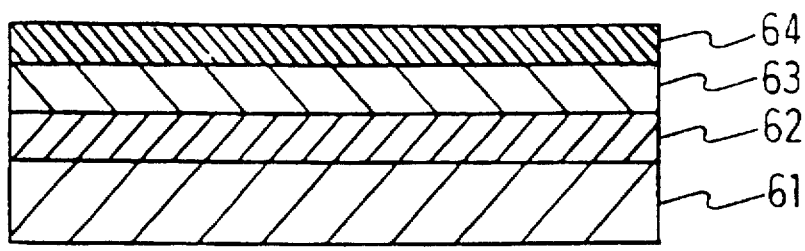
FIG. 8 is a cross sectional view of a lubricating film of Example 20 according to the invention.

Moreover, substrate 61 was dipped and held in a chloroform solution containing $CH_3(CF_2)_{17}CH_3$ at a concentration of 1.0 gram/liter, and both dipping and lifting speed was 1.5 mm/second. A thin film 64 (about 1 nanometer) of long-chain hydrocarbon molecules was formed on the surface of the chemically adsorbed multilayer film in a clean room atmosphere. FIG. 8 shows the cross sectional view of FIG. 8.

A CSS test was directed to a magnetic recording disc formed with the lubricating film of the example. According to the test, 200,000 repetitions of starting and stopping were cleared by the disc.

EXAMPLE 21

The number of hydroxyl groups on a substrate 71, made of stainless steel (SUS), was increased.

A solution was prepared by dissolving $SiCl_4$—a low molecular chemical adsorbent having four trichlorosilyl groups—into the mixed solvent of 80% by weight of hexadecane, 12 by weight of carbon tetrachloride and 8% by weight of chloroform at a concentration of 1 millimol/liter in a dry atmosphere. More specifically, the solution was prepared in a glove box containing nitrogen gas with 5% or less relative humidity.

Substrate 71 was dipped and held in the prepared solution for one hour at 23° C. in a dry atmosphere. A low molecular chemically adsorbed layer 72 was formed on the substrate surface due to the dehydrochlorination reaction between the chemical admolecules of the chemical adsorbent and the hydroxyl groups on the surface.

The low molecular chemical adsorbent that was not chemically reacted but physically adsorbed to the substrate surface was removed from the surface by agitating and washing substrate 71 in chloroform for 15 minutes in a dry atmosphere. This procedure was repeated once.

Substrate 71 was then washed with flowing extra-pure water for 15 minutes; as a result, the SiCl groups became SiOH groups.

Moreover, a solution was prepared by dissolving $CH_2=(CH_2)_{18}SiCl_3$—chemical admolecules having vinyl groups at one end and trichlorosilyl groups at another end of long chain alkyl groups—into the mixed solvent of 80% by weight of hexadecane, 12% by weight of carbon tetrachloride and 8% by weight of chloroform at a concentration of 1 millimol/liter in a dry atmosphere. More specifically, the solution was prepared in a glove box containing nitrogen gas with 5% or less relative humidity.

Substrate 71 was then dipped and held in the prepared solution for one hour at 23° C. in a dry atmosphere. A chemically adsorbed monomolecular film 73 was formed on the substrate surface due to the dehydrochlorination reaction between the chemical admolecules and the hydroxyl groups on the substrate surface.

The chemical admolecules that were not chemically reacted but physically adsorbed to the hydroxyl groups on the substrate surface were removed by agitating and washing substrate 71 in chloroform for 15 minutes in a dry atmosphere. This procedure was repeated once.

Substrate 71 was then washed with flowing extra-pure water for 15 minutes. As a result, the SiCl groups were reacted to neighbouring SiCl groups.

As a next step, substrate 71 was irradiated with an electron beam. The top side of the stainless steel (SUS) container was covered with aluminum foil, and was blanketed with nitrogen gas, thus preparing an apparatus used for an irradiation treatment. Substrate 71 was irradiated with 300 keV acceleration voltage, 50 microamperes electronic current, 1 atm gas-pressure and with 0.02 Gy/sec irradiation speed (absorbed dose rate) at room temperature for 100 seconds. As a result, the unsaturated groups at the end of long-chain hydrocarbon molecules (alkane groups in this example) were changed to imino and/or amino groups.

The second layer 74 of a chemically adsorbed multilayer film was formed by dipping and holding substrate 71, having imino and/or amino groups at the end of the long-chain hydrocarbon molecules, into a solution containing $CH_2=CH(CH_2)_{18}(CH_3)_2SiCl$. The conditions of preparing the solution and forming second layer 74 were the same as the conditions applied for forming chemically adsorbed monomolecular film 73.

Moreover, the groups at the end of the long-chain hydrocarbon molecules were changed to imino and/or amino groups by the irradiation treatment mentioned above. The irradiated substrate 71 was then dipped and held in a solution containing $CF_3(CH_2)_{18}(CH_3)_2SiCl$, thus forming the third layer 75 of the chemically adsorbed multilayer film.

Furthermore, substrate 71 was dipped and held in a chloroform solution containing $CH_3(CF_2)_{17}CH_3$ at a concentration of 1.0 gram/liter, and both dipping and lifting speed was 1.5 mm/second. A thin lubricating film 76 (about 1 nanometer) of long-chain hydrocarbon molecules was then formed on the surface of the chemically adsorbed multilayer film in a clean room atmosphere, thereby forming a lubricating film of the example.

Figure 9:
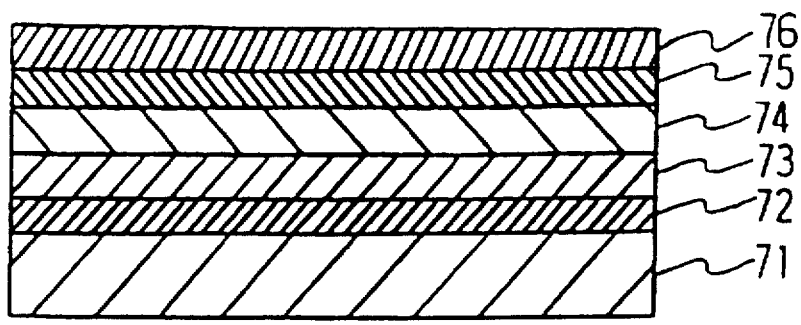
FIG. 9 is a cross sectional view of a lubricating film of Example 21 according to the invention.

FIG. 9 shows the cross sectional view of the lubricating film.

A sliding test was directed to substrate 71 formed with the lubricating film. A steel ball, weighted 100 grams, was slid on the substrate surface in a range of 10 cm. Even though the number of sliding was increased, the coefficient of dynamic friction remained the same, thus showing the formation of a durable lubricating film on the substrate surface. The coefficient of dynamic friction was 0.1 after 5,000 sliding tests.

EXAMPLE 22

By applying a semiconductor manufacturing process to the example, a wheel at a micron level was formed on the surface of a silicon substrate. The procedures of Example 1 were again followed in this example to form a lubricating film on the surface of the wheel. Due to the lubricating film of the invention, the sliding between the wheel and an axle and also between wheels became smooth, thereby providing smooth rotation of the wheel and reducing the irregularity of the process.

The organic molecule applied to the surface of the chemically adsorbed monomolecular film is at least one molecule selected from the group consisting of long-chain hydrocarbon-based fatty acids, long-chain hydrocarbon-based fatty acid esters, silicon derivatives, fatty acid salts, fatty acid amides and fluorocarbon derivatives.

EXAMPLE 23

A high molecular binder filled with powder of iron oxide was shaped like a disc, and formed with the thin film of silicon oxide, thus providing a substrate of the example, having hydroxyl groups containing numerous active hydrogens on the surface exposed for adsorption.

A solution was prepared by dissolving $H(CH_3)_2Si(CH_2)_{18}SiCl_3$—chemical admolecules having dimethylsilyl groups at one end and trichlorosilyl groups at another end of long-chain alkyl groups—into chloroform at a concentration of 1 millimol/liter in a dry atmosphere. More specifically, the preparation of the solution was carried out in a glove box containing nitrogen gas with 5% or less relative humidity.

As a next step, ultrasonic vibration and heat was provided to the above-noted solution, thus turning the solution into fine grain particles and a gaseous body. The substrate was then exposed to the gaseous phase atmosphere of the solution for one hour in a dry atmosphere. As a result, a chemically adsorbed monomolecular film was formed due to the dehydrochlorination reaction between the chemical admolecules and the hydroxyl groups on the substrate surface.

An oxidation treatment solution was prepared in the following procedures:

dissolving 140 mg potassium fluoride (reaction accelerator) into 50 ml methanol and throughly agitating the solution at room temperature;

dissolving 250 mg potassium hydrogen carbonate into 50 ml tetrahydrofuran, adding 25 ml hydrogen peroxide solution (30% by volume) and then throughly agitating the solution at room temperature;

mixing the above-noted two solutions, thus fixing the oxidation treatment solution.

The substrate formed with the chemically adsorbed monomolecular film was dipped and held in the prepared oxidation treatment solution for 10 hours at room temperature. As a result, the C—Si bond of the dimethylsilyl group at the end of the long-chain hydrocarbon molecule of the chemically adsorbed monomolecular film was cut off, and a hydrocarbon group instead was formed at the end of the long-chain hydrocarbon chain molecule of the film.

The substrate, having OH groups at the end of the long-chain hydrocarbon molecules, was again dipped and held in a solution containing $H(CH_3)_2Si(CH_2)_{18}(CH_3)_2SiCl$, thus forming the second layer of a chemically adsorbed multilayer film. The conditions for preparing the solution and forming the second layer were the same as the conditions applied for forming the first chemically adsorbed monomolecular film.

The group at the end of the long-chain hydrocarbon molecule was changed to a hydroxyl group by the oxidation treatment mentioned above. The substrate was then dipped and held in a solution containing $CF_3(CH_2)_{18}(CH_3)_2SiCl$, thus forming the third layer of the chemically adsorbed multilayer film (lubricating film).

The cross sectional view of the lubricating film was the same as FIG. 1.

In the examples mentioned above, a lubricating film was used only for a recording medium. However, a lubricating film of the invention can be applied to other recording mediums—such as a hard disc, magnetic tape, magnetic card, photo-electro magnetic disc and memory card—and sliding parts including a crank, shaft, bearing and micromechanics.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A multilayer lubricating film, comprising
   (i) a substrate,
   (ii) a first chemically adsorbed monomolecular layer comprising carbon-chain molecules covalently bonded to at least one side of said substrate, and
   (iii) a second chemically adsorbed monomolecular layer on the surface of the previously formed first chemically adsorbed layer, and wherein said second layer comprises
   (a) carbon-chain molecules and
   (b) monofunctional Z-bonds, wherein said second layer is bonded to said first layer via said monofunctional Z-bonds, where Z represents at least one element selected from the group consisting of Si, Ti, and Sn, and said second layer does not contain intermolecular crosslinks between juxtaposed molecules.

2. A lubricating film according to claim 1, further comprising one or more layers of molecules comprising carbon chains which are physically adsorbed to the surface of said second chemically adsorbed monomolecular layer.

3. A lubricating film according to claim 1, wherein the second chemically adsorbed monomolecular layer comprising carbon-chain molecules is built upon the surface of a previously formed chemically adsorbed layer through at least one chemical bond selected from the group consisting of Formulas 1, 2 and 3, wherein Formula 1 comprises the designation

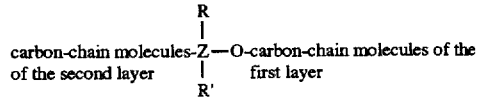

where R and R' represent an alkyl group having 1 to 6 carbon atoms, and Z represents Si;

Formula 2

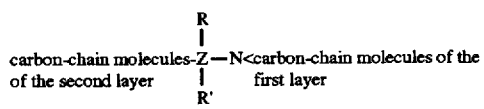

where R and R' represent an alkyl group having 1 to 6 carbon atoms, and Z represents at least one element selected from the group consisting of Si, Ti and Sn;

Formula 3

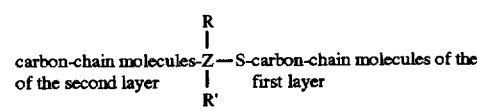

where R and R' represent an alkyl group having 1 to 6 carbon atoms, and Z represents at least one element selected form the group consisting of Si, Ti and Sn.

4. A lubricating film according to claim 1, wherein the carbon-chain molecules constituting at least the surface of said second chemically adsorbed monomolecular layer comprise fluorocarbon groups.

5. A lubricating film according to claim 1, wherein the number of carbon atoms of said carbon-chain molecules of said first or second chemically adsorbed monomolecular film is between 8 and 30.

6. A lubricating film according to claim 1, wherein said substrate is at least one material selected from the group consisting of ceramics, metals, resins, wood, inorganics, papers, fiber and information recording media.

7. A lubricating film according to claim 1, wherein the substrate surface has active hydrogen containing groups, or wherein said substrate according to claim 6 is treated to expose the active hydrogens on its surface.

* * * * *